(12) United States Patent
Yamada et al.

(10) Patent No.: US 6,174,583 B1
(45) Date of Patent: Jan. 16, 2001

(54) ALUMINUM NITRIDE SINTERED BODY, METAL INCLUDING MEMBER, ELECTROSTATIC CHUCK, METHOD OF PRODUCING ALUMINUM NITRIDE SINTERED BODY, AND METHOD OF PRODUCING METAL INCLUDING MEMBER

(75) Inventors: Naohito Yamada, Kasugai; Yukimasa Mori, Nagoya; Yuki Bessho, Nishikasugai-Gun; Hiromichi Kobayashi, Yokkaichi, all of (JP)

(73) Assignee: NGK Insulators, Ltd. (JP)

( * ) Notice: Under 35 U.S.C. 154(b), the term of this patent shall be extended for 0 days.

(21) Appl. No.: 09/391,381

(22) Filed: Sep. 8, 1999

Related U.S. Application Data

(62) Division of application No. 08/744,774, filed on Nov. 1, 1996, now Pat. No. 5,998,320.

(30) Foreign Application Priority Data

| Nov. 1, 1995 | (JP) | ................................................. 7-285011 |
| Jul. 5, 1996 | (JP) | ................................................. 8-176263 |
| Oct. 16, 1996 | (JP) | ................................................. 8-293129 |

(51) Int. Cl.[7] .............................. B32B 15/00; B32B 9/00; B28B 1/30

(52) U.S. Cl. .......................... 428/67; 428/457; 428/698; 428/699; 264/642; 269/13; 279/128

(58) Field of Search .............................. 428/67, 457, 688, 428/689, 698, 699; 269/13; 279/128; 361/233; 264/642

(56) References Cited

U.S. PATENT DOCUMENTS

| 4,672,046 | 6/1987 | Sawamura et al. .................. 501/98.5 |
| 4,711,861 | 12/1987 | Sawamura et al. .................. 501/98.5 |
| 4,959,258 | 9/1990 | Yoshida et al. ....................... 428/192 |
| 5,376,601 | 12/1994 | Okawa et al. ......................... 501/98 |

(List continued on next page.)

FOREIGN PATENT DOCUMENTS

| 0 237 072 A2 | 9/1987 | (EP) . |
| 0 237 072 A3 | 9/1987 | (EP) . |
| 2-22166 | 1/1990 | (JP) . |
| 7-19831 | 3/1995 | (JP) . |

OTHER PUBLICATIONS

Database WPI, Week 9628, Derwent Publications Ltd., London, GB; AN 96–271230, SP002037205 & JP 07 226 431 A (Kyocera Corp.), Aug. 22, 1995, *abstract*.

Chemical Abstracts, vol. 109, No. 4, Jul. 25, 1988, Columbus, Ohio, US; abstract No. 26718, T. Mimori et al.: XP002037204 *abstract* & JP 63 085 055 A (Asahi Glass Co., Ltd.).

Patent Abstracts of Japan, vol. 012, No. 330 (E–655), Sep. 7, 1988 & JP 63 095644 A (Nippon Telegr. & Teleph. Corp. (NTT)), Apr. 26, 1988, *abstract*.

*Primary Examiner*—Timothy Speer
*Assistant Examiner*—Bryant Young
(74) *Attorney, Agent, or Firm*—Parkhurst & Wendel, L.L.P.

(57) ABSTRACT

An aluminum nitride sintered body has characteristics such that an amount of total metal elements other than aluminum is smaller than 100 ppm, and a volume resistivity at room temperature is greater than $1.0 \times 10^9$ $\Omega \cdot$cm and is smaller than $1.0 \times 10^{13}$ $\Omega \cdot$cm. A metal including member has such a construction that a metal member is embedded in the aluminum nitride sintered body mentioned above. An electrostatic chuck is made by the metal including member mentioned above. In the metal including member mentioned above in which the metal member is embedded in the aluminum nitride sintered body mentioned above, a volume resistivity thereof can be controlled without adding a low resistance material in aluminum nitride.

10 Claims, 15 Drawing Sheets

(1 of 15 Drawing Sheet(s) Filed in Color)

OTHER PUBLICATIONS

| | | | |
|---|---|---|---|
| 5,413,360 | 5/1995 | Atari et al. | 279/128 |
| 5,668,524 | 9/1997 | Aida et al. | 338/308 |
| 5,908,799 | 6/1999 | Kobayashi et al. | 501/98.4 |
| 5,955,686 | 9/1999 | Sakuraba et al. | 75/235 |
| 5,998,320 | 12/1999 | Yamada et al. | 501/98.4 |
| 6,001,760 | 12/1999 | Katsuda et al. | 501/98.4 |
| 6,017,485 | 1/2000 | Enck et al. | 264/618 |

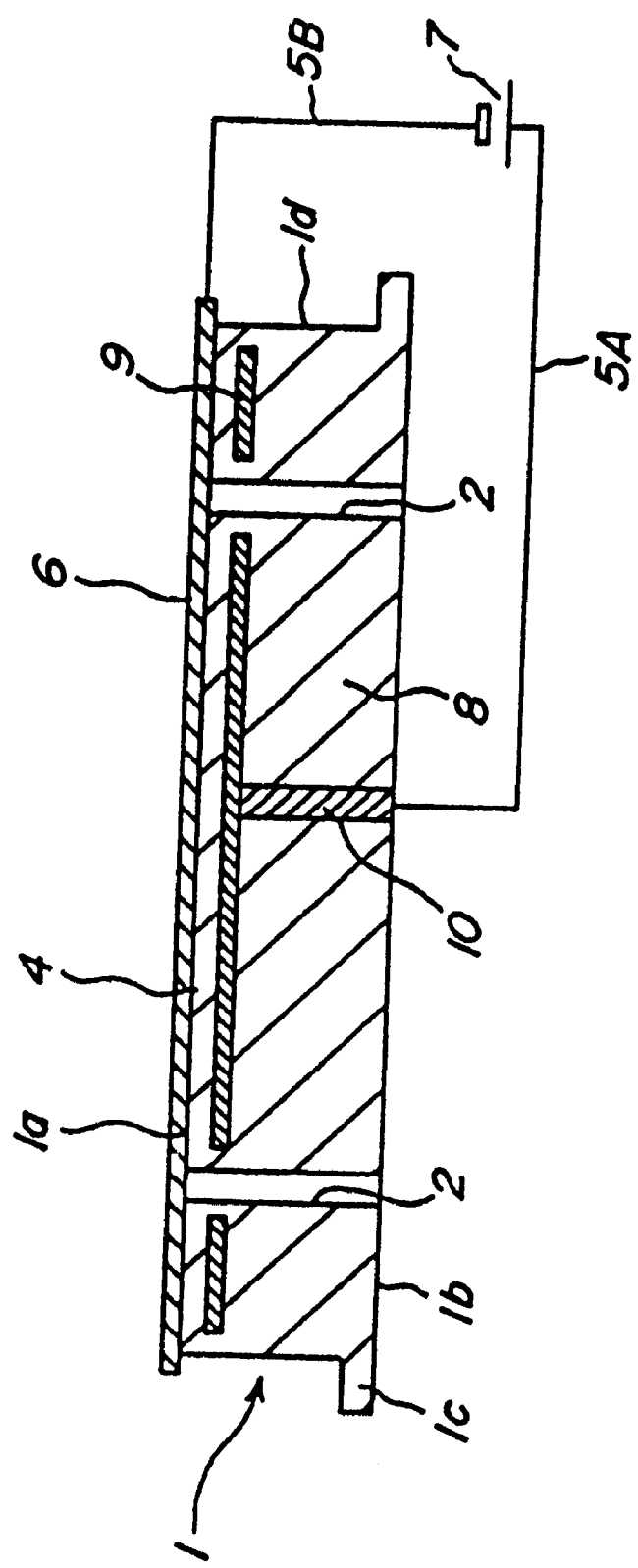

FIG_5a
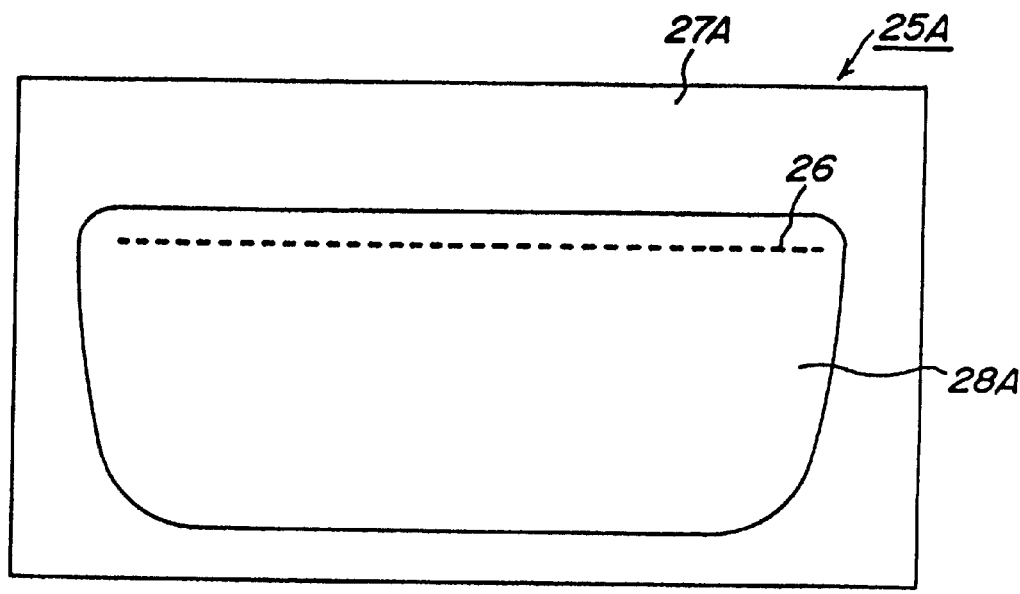
FIG_5b
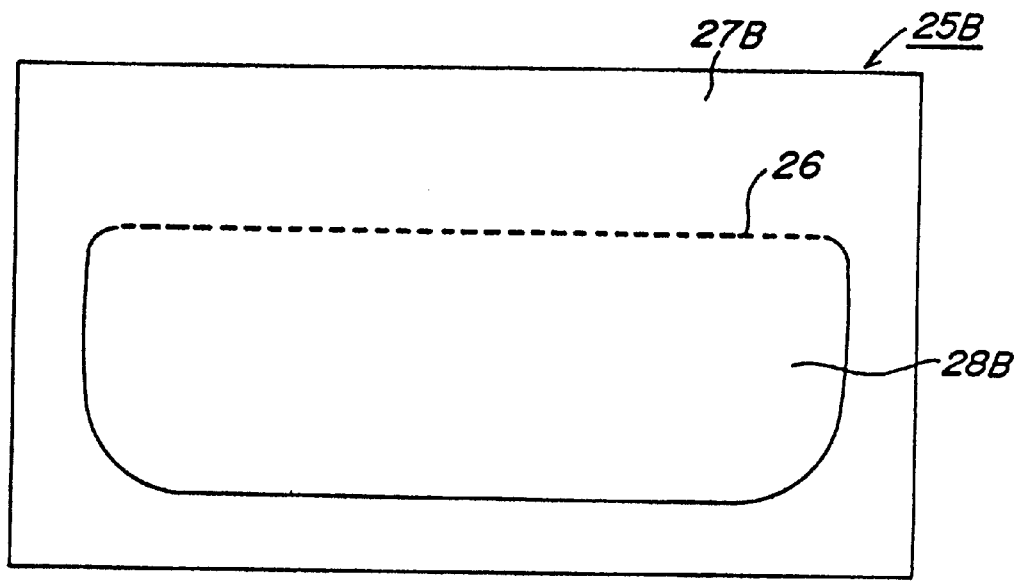

FIG_12

10 µm

ALUMINUM NITRIDE SINTERED BODY, METAL INCLUDING MEMBER, ELECTROSTATIC CHUCK, METHOD OF PRODUCING ALUMINUM NITRIDE SINTERED BODY, AND METHOD OF PRODUCING METAL INCLUDING MEMBER

This is a Division of application Ser. No. 08/744,774 filed Nov. 1, 1996 U.S. Pat. No. 5,998,320.

BACKGROUND OF THE INVENTION

1. Field of the Invention

The present invention relates to an aluminum nitride sintered body and a method of producing the same, and to a metal including member used as a function gradient member in which a metal member is embedded in an aluminum nitride sintered body. Moreover, the present invention especially relates to an electrostatic chuck preferably used in a semiconductor manufacturing apparatus.

2. Related Art Statement

Generally, an electrostatic chuck is used for chucking a semiconductor wafer in film forming steps of transferring, exposing, chemical vapor depositing, and spattering the semiconductor wafer, or in steps of micro-machining, washing, etching, and dicing. As a substrate member of the electrostatic member, a densified ceramics is sometimes used. Particularly, in a field of semiconductor manufacturing apparatuses, a halogen corrosive gas such as CIF is frequently used as an etching gas or a cleaning gas. Moreover, in order to rapidly heat or cool the semiconductor wafer while the semiconductor wafer is chucked, it is desirable that the substrate member of the electrostatic chuck has a high thermal conductivity. Further, in order not to fracture the substrate member due to a rapid temperature variation, it is desirable that the substrate member has a thermal shock resistivity. A densified aluminum nitride has a high corrosion resistivity with respect to the halogen corrosive gas mentioned above. Moreover, it is known that aluminum nitride has a high thermal conductivity and its volume resistivity is greater than $10^{14}$ Ω·cm. Further, it is known that aluminum nitride has a high thermal shock resistivity. Therefore, it is preferred to form the substrate member of the electrostatic chuck for the semiconductor manufacturing apparatus using an aluminum nitride sintered body.

On the other hand, in the semiconductor manufacturing apparatus, in order to use the electrostatic chuck as a suscepter for holding the semiconductor wafer, it is necessary to decrease the resistivity of the substrate member. For example, in Japanese Patent Publication No. 7-19831, in order to improve a chucking property of the electrostatic chuck, the volume resistivity of an insulation dielectric layer of the electrostatic chuck is decreased to smaller than $10^{13}$ Ω·cm by mixing a conductive material or a semiconductive material into an insulation member having a high volume resistivity. Moreover, in Japanese Patent Laid-Open Publication No. 2-22166, ceramic raw materials made of alumina as a main ingredient are sintered under a reduction atmosphere to produce a dielectric ceramic for the electrostatic chuck. In this case, 1–6 wt % of alkali earth metal and 0.5–6 wt % of transition metal, both shown as a weight of oxide, are included in the ceramic raw materials. In this method, for example, a dielectric rate is improved by mixing $TiO_2$ into alumina ceramics and a volume resistivity is decreased to $10^{12}$–$10^{18}$ Ω·cm, to obtain a high chucking property.

However, the volume resistivity of a highly purified alumina nitride sintered body is greater than $10^{14}$ Ω·cm, and thus it is too high to use as the substrate member of the electrostatic chuck for the semiconductor manufacturing apparatus. In this case, in order to obtain a sufficient chucking property, it is necessary to form an extremely thin insulation dielectric layer having a thickness smaller than 300 μm. However, if the insulation dielectric layer is thin as mentioned above, there is a possibility of generating an insulation fracture and so on from one of the reaction layers in a surface of the insulation dielectric layer. From this point of view, we understand that it is preferred to make the thickness of the insulation dielectric layer greater than 500 μm.

However, in the known electrostatic chuck made of aluminum nitride, if the insulation dielectric layer is made thick as mentioned above, a chucking property of the electrostatic chuck is decreased, and thus it is difficult to obtain a sufficient chucking property particularly in a low temperature region in which a volume resistivity is high. Usually, a dry etching process is performed under a low temperature of –50° C.~–60° C., and a highly densified plasma CVD process is performed at about 100° C. In these low temperature processes, it is difficult to obtain-a predetermined chucking property stably.

In the electrostatic chuck in which aluminum nitride is used for a material of the substrate member, we think it is effective to add a metal member having a low resistivity in the substrate member as shown in Japanese Patent Publication No. 7-19831. However, in the electrostatic chuck mentioned above, the metal member having a low resistivity and so on is detached from a surface of the substrate member, and thus there is a possibility of being a cause of semiconductor pollution. Therefore, it is not preferred to use the electrostatic chuck mentioned above for a highly purified semiconductor process such as a process for 8 inch wafer.

SUMMARY OF THE INVENTION

An object of the present invention is to provide an electrostatic chuck that can be used under a wide temperature range from a low temperature of –60° C. to a Os high temperature of over 300° C., that has a stability with respect to a corrosive substance such as halogen corrosive gas or plasma, and that can minimize a removal of metal and so on from a substrate member thereof.

Another object of the present invention is to provide a metal including member that can be preferably used as an electric apparatus in a process i.e. a semiconductor manufacturing process using an electrostatic chuck and so on which requires use of highly purified substrate members.

Still another object of the present invention is to provide an aluminum nitride sintered body in which the amount of metal impurities is small and a volume resistivity thereof is low.

According to the invention, an aluminum nitride sintered body comprises characteristics such that an amount of total metal elements other than aluminum is smaller than 100 ppm, and a volume resistivity at room temperature is greater than $1.0 \times 10^9$ Ω·cm and is smaller than $1.0 \times 10^{13}$ Ω·cm.

Moreover, according to the invention, an aluminum nitride sintered body comprises characteristics such that an amount of total metal elements other than aluminum is smaller than 100 ppm, and a g-value of unpaired electrons is smaller than 2.0000 on a spectrum of aluminum nitride measured by an electron spin resonance method.

Moreover, according to the invention, an aluminum nitride sintered body comprises characteristics such that an amount of total metal elements other than aluminum is smaller than 100 ppm, and an amount of spin per unit mg of aluminum obtained from a spectrum on an electron spin resonance method is greater than $5\times10^{12}$ spin.

Moreover, according to the invention, an aluminum nitride sintered body comprises characteristics such that an amount of total metal elements other than aluminum is smaller than 100 ppm, and a main peak of a spectrum measured by a cathode luminescence method exists in a wavelength region from 350 nm to 370 nm.

Further, according to the invention, a metal including member comprises a construction such that a metal member is embedded in a substrate member made of an aluminum nitride sintered body, said metal member and said substrate member are integrally sintered, and a part of said substrate member is made of the aluminum sintered body mentioned above.

The inventors performed an examination having the steps of forming highly purified aluminum nitride powders in which a metal member is included to obtain a formed body, and sintering integrally the thus obtained formed body by means of a hot press method. During this examination, we found that a volume resistivity of the substrate member made of aluminum nitride, to which at least one side of the metal member is contacted, is extremely decreased, and the phenomena lead to the present invention. The phenomena are not known until now in the highly purified aluminum nitride sintered body.

In the metal including member according to the invention, the aluminum nitride formed body and the metal member arranged therein are integrally formed, and thus, in the metal including member, the substrate member made of aluminum nitride is substantially divided by the metal member embedded therein. In this case, the aluminum nitride sintered body having an extremely low volume resistivity is found at a first portion to which at least one side of the metal member is contacted. In this embodiment, since the aluminum nitride formed body and the metal member are integrally sintered, it is not possible to control in such a manner that only the first portion has a low volume resistivity by adding a low resistance material such as metal in the first portion. In the metal including member according to the invention, a base chemical composition of aluminum nitride is maintained at overall portions of the substrate member, and thus a removal of the low resistance material from the aluminum nitride substrate member can be eliminated completely. Therefore, the metal including member can be used preferably in the semiconductor manufacturing apparatus in which such a removal of the low resistance material must be eliminated.

The metal including member according to the invention can be applied to various purposes which use the member in which the metal member is embedded in the substrate member made of aluminum nitride, and can be preferably used as an electrode embedded member used under an environment in which impurities must be eliminated. As example of such purposes, ceramic electrostatic chuck, ceramics heater, and high frequency electrode apparatus can be mentioned, and, particularly, the metal including member according to the invention can be preferably applied to the electrostatic chuck.

In the case of using the metal including member according to the invention as the electrostatic chuck, since a volume resistivity of the first portion is smaller than $1.0\times10^{13}$ $\Omega\cdot$cm at room temperature, it is possible to improve a chucking property of the electrostatic chuck. In this case, if the thickness of the first portion using as an insulation dielectric layer is made greater than 500 $\mu$m, it is possible to obtain a sufficient chucking property. This is because, even in that case, electric charges appear on a surface of the insulation dielectric layer from the electrode. Therefore, according to the invention, it is possible to chuck and hold a large semiconductor wafer greater 8 inches stably in a wide temperature range from a low temperature such as −60° C. to a high temperature such as over 300° C.

Since the substrate member of the metal including member is integrally sintered with the metal member embedded in the formed body, the chemical composition of aluminum nitride which constitutes the substrate member is not basically varied at between the first portion and the second portion. Here, in the case of using the highly purified aluminum powders mentioned above, it is possible to obtain the aluminum sintered body having a relative density of over 95.0% by sintering integrally using of the hot press method.

In the present invention, the metal including member is obtained by preparing an aluminum nitride raw material having an amount of total metal elements other than aluminum of smaller than 100 ppm, forming the thus prepared aluminum nitride raw material to obtain a formed body, embedding a metal member in the thus obtained formed body to obtain a metal including formed body, and sintering the thus obtained metal including formed body under a temperature of 1850° C.–2200° C. In the metal including member, the substrate member is substantially divided into a first portion and a second portion by the metal member. Actually, the second portion was cut out from the substrate member, and a volume resistivity of the second portion was measured at room temperature. As a result, measured volume resistivities are in a range of $3.0\times10^{13}\sim1.0\times10_{14}$ $\Omega\cdot$cm.

At the same time, the first portion was cut out from the substrate member, and a volume resistivity of the first portion was measured at room temperature. As a result, measured volume resistivities are decreased under $1.0\times10^{13}$ $\Omega\cdot$cm. That is to say, a volume resistivity of the first portion is decreased by 10~100 times as compared with that of the second portion. Moreover, a volume resistivity of the first portion does not fall below $1\times10^9$ $\Omega\cdot$cm.

In order to use the metal including member as a function gradient member, it is preferred to set a ratio of a volume resistivity between the first portion and the second portion to 1:10 or more.

In raw materials made of aluminum nitride powders, it is better to minimize the amount of metal elements other than aluminum, and the amount of metal elements other than aluminum is preferably under 100 ppm. Here, a term of "metal elements other than aluminum" means metal elements belonging to Ia~VIIa, VII, Ib, or IIb group in the periodic law table and also a part of elements (Si, Ga, Ge, etc) belonging to IIIb, or IVb group.

In the present invention, the metal member is embedded in the aluminum nitride formed body. In this step, the following method can be utilized.

Method (1): A preliminary formed body is produced, and a metal member is arranged on the preliminary formed body. Then, ceramics powders are filled on the preliminary formed body and the metal member in a press machine, and then a uniaxial pressure is applied in the press machine to obtain the formed body.

Method (2): Two plate-like formed bodies are produced by a cold isostatic press method, and a metal member is sandwiched by two plate-like formed bodies. Under such a condition, two plate-like formed bodies and the metal member are hot-pressed.

The metal member is formed preferably by a plate-like metal bulk member. In the case that the metal including member is an electrostatic chuck, the metal member is a plate-like electrode made of the metal bulk member. Here, a term "plate-like metal bulk member" means a member formed by arranging a metal wire or a metal plate in a plate-like shape as shown in FIGS. 2 and 3 without arranging the metal wire or the metal plate in a spiral shape or a zigzag shape.

Since the metal member is integrally sintered with the aluminum nitride powders, the metal member is formed preferably by a metal member having a high melting point. As the metal member having a high melting point, use is preferably made of tantalum, tungsten, molybdenum, platinum, rhenium, hafnium or an alloy of these elements mentioned above. From the view point of semiconductor pollution, it is further preferred to use tantal, tungsten, molybdenum, platinum or an alloy of these elements mentioned above. As for a work chucked by the electrostatic chuck, an aluminum wafer is shown other than the semiconductor wafer.

In order to produce the metal including member according to the invention, it is preferred that the metal member is a metal bulk member and that, in the formed body, a thickness of the first portion is smaller than that of the second portion. In this case, the thicknesses of the first portion and the second portion mean a thickness viewed perpendicularly from a surface of the metal bulk member. It is preferred to set a ratio of thickness between the first portion and second portion to 1:2~1:50.

Moreover, a volume resistivity of the first portion is further decreased if a thickness of the first portion is preferably set to smaller than 10 mm. In order to produce the metal including member as a function gradient member, it is preferred to set a thickness of the second portion to greater than 10 mm, preferably greater than 20 mm. An upper value of the thickness is not limited here, but is determined according to a size of the metal including member. Moreover, it is further preferred to set a thickness of the first portion after sintering to greater than 1.0 mm and smaller than 10.0 mm, preferably greater than 1.0 mm and smaller than 5.0 mm.

From the view point of stability during manufacturing, it is preferred to set a thickness of the first portion and a thickness of the second portion to greater than 3.0 mm.

Moreover, in the metal including member mentioned above, the metal member is sintered integrally with the aluminum nitride formed body under such a condition that both of the thicknesses of the first portion and the second portion are set to smaller than 5 mm. In this case, both of volume resistivities of the first portion and the second portion are decreased under $1 \times 10^{13}$ $\Omega \cdot Cm$.

In order to further decrease these volume resistivities, it is further preferred to set a thickness of the first portion to smaller than 4.0 mm.

In the case of producing the metal including member according to the invention, it is preferred that the metal member is the plate-like metal bulk member and that the integral sintering is performed under such a condition that a pressure is applied perpendicularly with respect to a surface of the plate-like metal bulk member. In this case, in order to produce the metal including member as the function gradient member, it is preferred to set a ratio of thickness between the first portion and the second portion to 1:3 or more, particularly 1:5 or more, so as to make a difference of volume resistivity between the first portion and the second portion sufficiently larger as the function gradient member. In this case, an upper value of the thickness ratio does not exist theoretically, but, from the view point of an actual manufacturing, it is preferred to set the ratio of thickness between the first portion and the second portion to 1:50 or less.

As the plate-like metal bulk member, the following are shown.
(1) A plate-like metal bulk member made of a thin plate.
(2) A bulk member in which a plurality of small spaces is formed in a plate-like electrode. This includes a bulk member in which a plurality of small holes are formed in a plate-like member, and a bulk member made of a net. As the plate-like member having a plurality of small holes, use is made of a punching metal. In the case of using the punching metal made of a metal having a high melting point, since the metal having a high melting point is hard, it is difficult to form a plurality of small holes in the plate-like member having a high melting point by punching, and thus a machining cost becomes extremely higher. On the other hand, if use is made of the bulk member made of the net, it is easy to prepare a wire member made of a metal having a high melting point, and thus the metal net is easily formed by knitting the wire members.

In this case, a mesh shape of the metal net and a wire diameter are not limited here. However, the metal including member satisfying a condition of wire diameter: 0.03 mm, 150 mesh~wire diameter: 0.5 mm, 6 mesh can be used with no problem. Moreover, a cross sectional shape of the wire member which constructs the metal net may be circular, ellipse, rectangle or the other various rolled shape. Here, 1 mesh means 1 per 1 inch.

When the formed body covering the metal member is sintered under pressure, a sintering temperature is 1850~2200° C. according to the invention. In this case, it is preferred to set a pressure during sintering to greater than 50 kgf/cm$^2$, preferably greater than 100 kgf/cm$^2$. A volume resistivity of the first portion depends on sintering temperature, pressure, and a time maintained at a sintering temperature i.e. a highest temperature during sintering (keep time). In this case, a volume resistivity of the first portion cut out from the sintered body can be controlled in a range of $1.0 \times 10^{13}$ $\Omega \cdot cm$~$1.0 \times 10^9$ $\Omega \cdot cm$ by suitably selecting pressure, sintering temperature and keep time within the above mentioned ranges.

In order to produce the metal including member certainly, it is preferred to set a sintering temperature to greater than 1900° C. Moreover, an upper limit of a sintering temperature is 2200° C., since a deterioration of the metal member is liable to be generated if a sintering temperature exceeds 2200° C.

Moreover, as a time for integrally sintering the formed body, it is necessary to perform a sintering at least for 5 hours under a sintering temperature of greater than 1850° C. and not greater than 1900° C. Even in a sintering temperature of greater than 1900° C. and not greater than 2000° C., it is necessary to keep for 2 hours or more at a highest temperature (sintering temperature). Further, if the keep time is made more than 3 hours, preferably more than 5 hours, a volume resistivity is further decreased. At a sintering temperature of greater than 2000° C., the volume resistivity is decreased by keeping the body for 1 hour or more at the highest temperature. From the view point of an actual productivity on a sintering furnace, it is preferred to set these keep times to 30 hours or less.

In the case of applying the present invention to the electrostatic chuck, it is possible to use an electrode as an electrode for plasma generation by connecting a high frequency power source to electrodes of the electrostatic chuck, and supplying a high frequency voltage to the electrodes together with a DC voltage. In this case, if the electrodes are for example made of tungsten and a frequency is 13.56 MHz, it is desirable to set a thickness of the electrode to 430 μm or more. However, since it is difficult to form the electrode having such a thickness by the screen printing method, the electrode is formed by the metal bulk member. Moreover, if a thickness of the insulation dielectric layer is within a range of 0.5 mm~5.0 mm, a self-heating due to a dielectric loss is not so large, and thus it is possible to use as the high frequency electrode.

In the present invention, the electrostatic chuck electrode or the high frequency electrode and so on of the electrostatic chuck or the electrode apparatus for generating plasma, which uses the aluminum nitride sintered body in which a total amount of metal elements other than aluminum is under 100 ppm and a volume resistivity is greater than $1.0 \times 10^6$ Ω·cm and smaller $1.0 \times 10^{13}$ Ω·cm, as the substrate member, may be formed by the screen printing method.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

FIG. 1 is a cross sectional view showing schematically a part of an electrostatic chuck to which the present invention is applied;

FIGS. 5a and 5b are schematic views illustrating respectively positions of respective sintered bodies in a metal including member according to the invention;

DESCRIPTION OF THE PREFERRED EMBODIMENT

Hereinafter, the present invention will be explained with reference to the drawings.

Figure 2A:
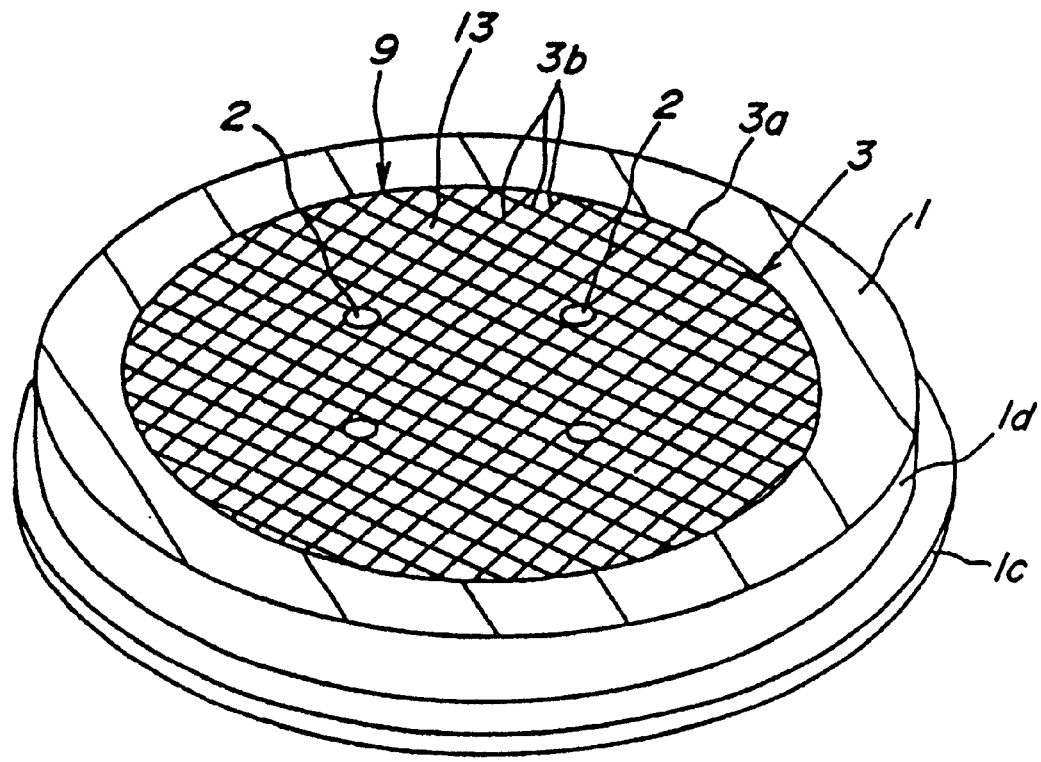
FIG. 2a is a perspective view illustrating a cross section of the electrostatic chuck shown in FIG. 1.
Figure 2B:
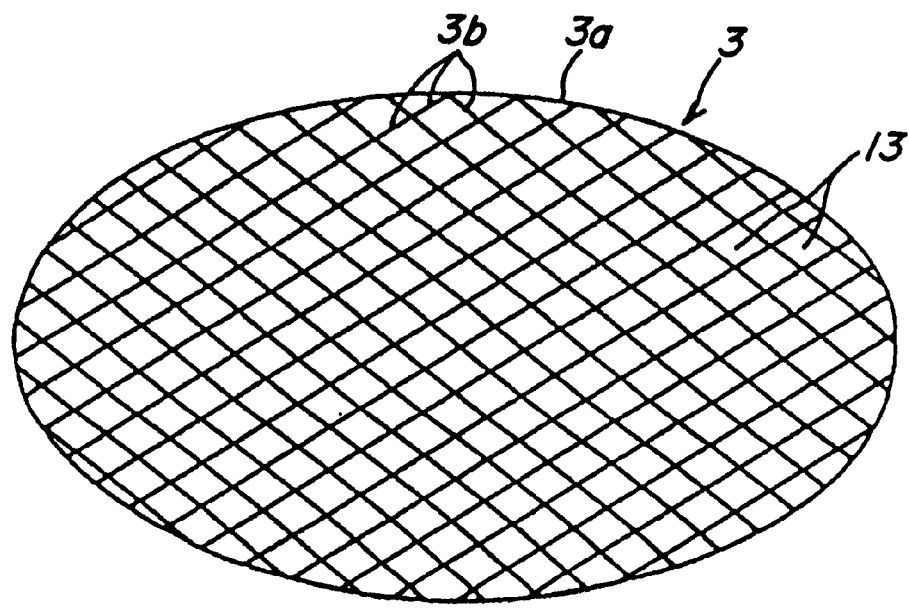
FIG. 2b is a perspective view depicting an electrode made of a metal net.

FIG. 1 is a cross sectional view showing schematically one embodiment of an electrostatic chuck. FIG. 2a is a perspective view illustrating a cut-out portion of the electrostatic chuck shown in FIG. 1, and FIG. 2b is a perspective view depicting an electrode 3 made of a metal net.

In these embodiments, a flange 1c having a ring shape is arranged on a side circumference surface 1d of a substrate member 1 having a substantially disc shape. An electrode 9 made of a metal net 3 is embedded in the substrate member 1. A semiconductor wafer 6 is held on a holding surface 1a. An insulation dielectric layer (first portion) 4 having a predetermined thickness is formed between the holding surface 1a and the electrode 9. A terminal 10 is embedded in a supporting portion 8 of the substrate member 1. One end of the terminal 10 is connected to the electrode 9, and the other end of the terminal 10 is exposed at a rear surface 1b of the substrate member 1. Through holes 2, through which a pin for elevating the semiconductor wafer 6 is arranged, are formed in the substrate member 1 at a predetermined positions.

A positive electrode of a DC power source 7 is connected to the terminal 10 via an electric wire 5A, and a negative electrode of the DC power source 7 is connected to the semiconductor wafer 6 via an electric wire 5B. In these embodiments, the electrode 9 is formed by the metal net 3 shown in FIGS. 2a and 2b. The metal net 3 comprises a circular wire 3a and a wire 3b arranged crosswise in the circular wire 3a. A mesh 13 is formed by the wire 3b.

Figure 3A:
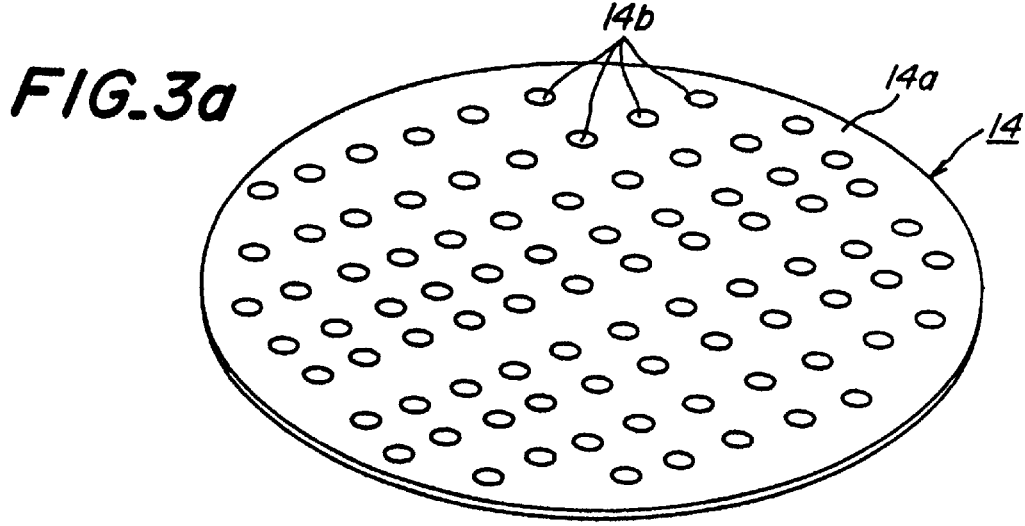
FIG. 3a is a perspective view showing a punching metal preferably used as the electrode.
Figure 3B:
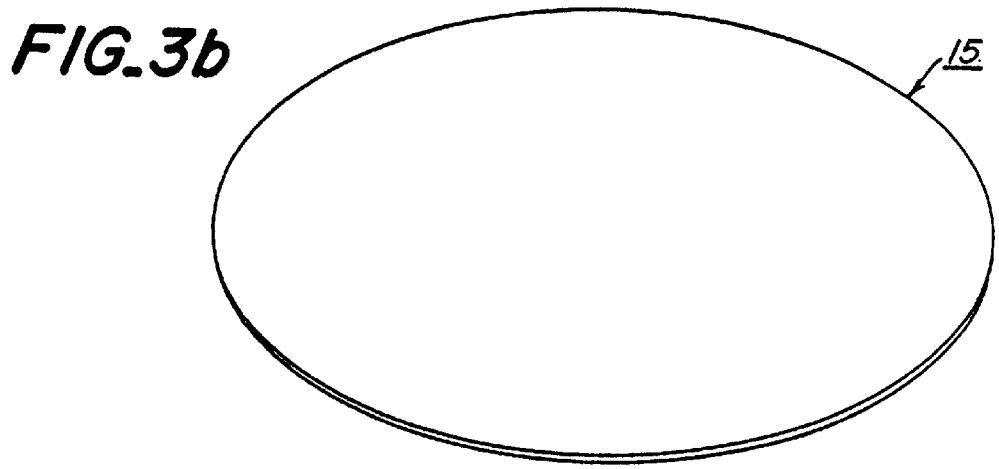
FIG. 3b is a plan view illustrating a circular thin plate which can be used as the electrode.
Figure 3C:
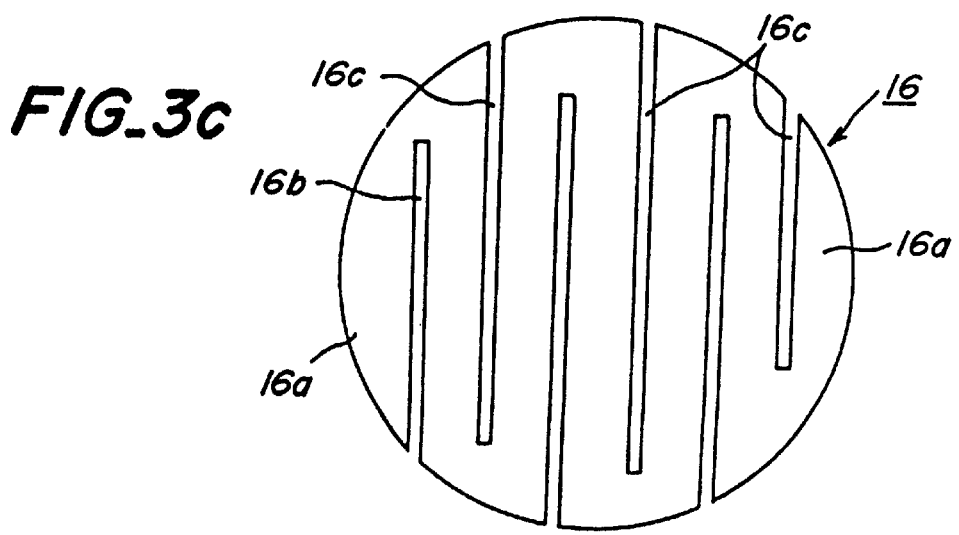
FIG. 3C is a plan view depicting a thin plate which can be used as the electrode.

FIG. 3a is a perspective view showing a punching Cs metal 14 which can be used for the electrode 9. The punching metal 14 has a circular shape. A plurality of holes 14b is formed in the punching metal 14 like a checkerboard pattern. FIG. 3b is a perspective view illustrating a circular thin plate 15 which can be used for the electrode 9. FIG. 3c is a plan view depicting a thin plate 16 which can be used for the electrode 9. Slit-like cut-out portions 16b and 16c are formed in the thin plate 16. In this embodiment, three slit-like cutout portions 16b and three slit-like cut-out portions is 16c are arranged alternately in a parallel manner. The slit-like cut-out portion 16b is opened downward in FIG. 3c, and the slit-like cut-out portion 16c is opened upward in FIG. 3c. Therefore, a narrow conductive line is formed in the thin plate 16. A terminal is connected to both ends 16a of the conductive line.

Figure 4:
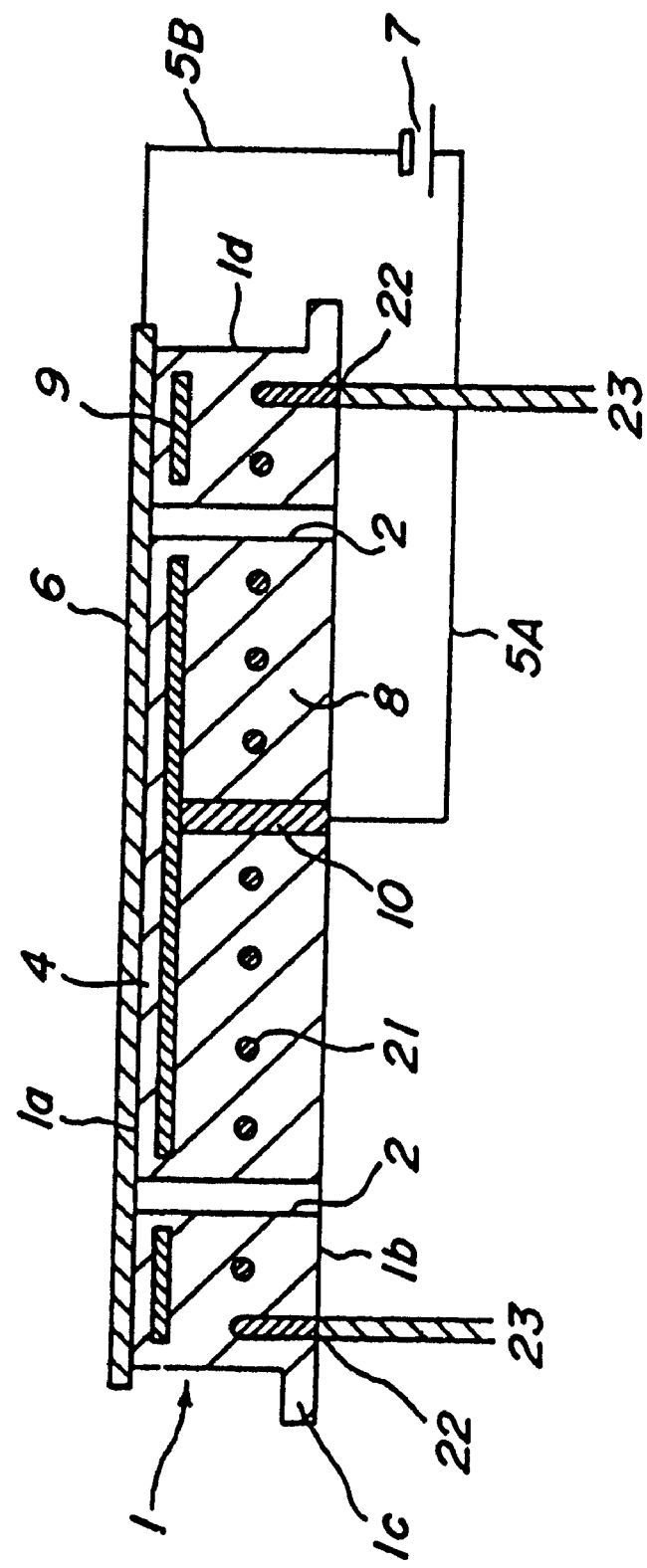
FIG. 4 is a cross sectional view showing schematically a part of the electrostatic chuck with heater to which the present invention is applied.

FIG. 4 is a cross sectional view showing schematically another embodiment of the electrostatic chuck. In FIG. 4, portions similar to those of FIG. 1 are denoted by the same reference numerals in FIG. 1, and explanations of those portions are omitted here. In this embodiment, a resistance heating member 21 is embedded in the supporting portion 8. A terminal 22 is connected to both ends of the resistance heating member 21. A cable 23 for feeding an electric power is connected to the terminals 22. The cable 23 is connected to a power source not shown.

The inventors further discussed in detail the reason for obtaining a sintered body having an extremely lowered volume resistivity from the insulation dielectric layer (first portion). During this discussion, the inventors found that a portion having an extremely lowered volume resistivity is generated in at least one side of the metal member by embedding a plate-like metal member made of molybdenum in a formed body, applying a predetermined pressure in a vertical direction with respect to a surface of the plate-like metal member, and sintering the formed body integrally under predetermined temperature, pressure, keep time, and so on. This cause is not clear.

The inventors performed an element analysis with respect to the first portion and the second portion of the aluminum sintered body as the substrate member to which the surfaces of the metal member made of molybdenum are respectively connected. As a result, it is found that molybdenum is a trace both in the first portion and the second portion. That is to say, it is confirmed that a conductivity increase is not performed by an inclusion of molybdenum into aluminum nitride.

However, such a possibility that a very small amount of molybdenum exists in a boundary of an aluminum nitride crystal and this phenomenon varies an energy band is not denied. Moreover, there is a possibility that a small amount of carbon or oxygen included in the metal member made of molybdenum before sintering is diffused toward a surface of the first portion during sintering or diffused toward the metal member made of molybdenum, and this phenomenon provides some influence.

Particularly, there is a case that the aluminum nitride sintered body having an extremely low volume resistivity is generated-on both surfaces of the metal member and the metal member is included in the aluminum nitride sintered body having an extremely low volume resistivity. For example, the embodiments shown in FIGS. 5a, 6a, 6b, 6c and 7, correspond to this case. In a structure that the metal member is included in the aluminum nitride sintered body as the substrate member, the metal member acts as some defects with respect to aluminum nitride. Therefore, in the case of heating the metal including member rapidly to a high temperature or in the case of subjecting the metal including member to a heat cycle between a low temperature and a high temperature, the substrate member is liable to be fractured at a neighborhood of the metal member. However, in a structure that the metal member is included in the aluminum nitride sintered body according to the invention in which a volume resistivity is low and a structure is densified, the metal member is not fractured due to a thermal shock.

The inventors produced many metal including members under various conditions by using various apparatuses, and discussed in detail about the first portion and the second portion cut out from the aluminum nitride sintered body. The results will be explained with reference to FIGS. 5a, 5b, 6a–6c and 7.

In a metal including member 25A shown in FIG. 5a, a metal member 26 is embedded in the substrate member, and an outer circumferential portion 27A thereof is constructed by a lightbrown or white-yellow sintered body, while a black-brown or black sintered body 28A is generated in the lightbrown or white-yellow sintered body. In a metal including member 25B shown in FIG. 5b, the metal member 26 is embedded in the substrate member, and an outer circumferential portion 27B thereof is constructed by a lightbrown or white-yellow sintered body, while a black-brown or black sintered body 28B is generated in the lightbrown or white-yellow sintered body. A surface of the metal member 26 at the insulation dielectric layer side is brought into contact with the lightbrown or white-yellow sintered body 27B, and a surface of the metal member 26 at the supporting portion side is brought into contact with the black-brown or black sintered body 28B.

In the lightbrown or white-yellow sintered body mentioned above, a volume resistivity at room temperature is greater than $1.0 \times 10^9$ Ω·cm and smaller than $1.0 \times 10^{13}$ Ω·cm, a g-value of unpaired electrons is smaller than 2.0000 on a spectrum of aluminum nitride measured by an electron spin resonance method, and an amount of spin per unit mg of aluminum obtained from a spectrum on an electron spin resonance method is greater than $5 \times 10^{12}$ spin. Moreover, it is preferred that a relative density of the aluminum nitride sintered body is greater than 99.5%. By analyzing a crystal structure of the aluminum nitride sintered body, it is found that there is an aluminum nitride main crystal phase and a circular ALON phase, but there is not a so-called 27R phase ($Al_2O_3$-7 phase).

It is preferred that an amount of spin of the aluminum nitride is greater than $6.0 \times 10^{12}$ spin/mg, especially greater than $6.9 \times 10^{12}$ spin/mg. It is further preferred that a volume resistivity of aluminum nitride at room temperature is greater than $8.0 \times 10^{12}$ Ω·cm. It is further preferred that a g-value of unpaired electrons of aluminum nitride is smaller than 1.9990.

On the other hand, in the black-brown or black sintered body mentioned above, a volume resistivity at room temperature is greater than $1.0 \times 10^{13}$ Ω·cm, a g-value of unpaired electrons is greater than 2.0040 (smaller than 2.0065), and an amount of spin is smaller than $4.5 \times 10^{12}$ spin/cm (preferably smaller than $4.2 \times 10^{12}$ spin/cm). Moreover, it is preferred that a relative density is greater than 99.0%, especially greater than 99.5%.

In this case, a main crystal phase is aluminum nitride, but the ALON phase is generated as a sub-crystal phase. Typically, in aluminum nitride mentioned above, ALON grains having a grain size of about 0.1 μm are generated in the aluminum nitride grains having a particle size of 3~3 μm.

Both in the lightbrown or white-yellow sintered body and in the black-brown or black sintered body, the lattice constants thereof do not differ from each other. That is to say, a specific relation between kinds of crystal phases other than the aluminum nitride crystal phase and a volume resistivity is not detected. Moreover, a mean size of the aluminum nitride grain particles is smaller than 3 μm in the black-brown or black sintered body and is 3~4 μm in the lightbrown or white-yellow sintered body, and thus they do not differ from each other substantially.

It is generally understood that an insulation resistance of ceramics is decreased, if the grain size becomes larger. This is because, if the grains become larger in the case that a resistance of the grain boundary is greater than that of the grain, the number of the boundaries is decreased, and a total resistance is decreased correspondingly. However, in highly purified aluminum nitride according to the invention, even if the grain sizes of the first portion and the second portion are substantially same, a volume resistivity is varied therebetween. This is contrary to the general knowledge. Therefore, it is understood that a variation of volume resistivity of aluminum nitride not only depends on kind and grain size of the crystal phase, but also depends on a defect in the aluminum nitride crystal phase and a defect of the boundary.

Figure 6A:
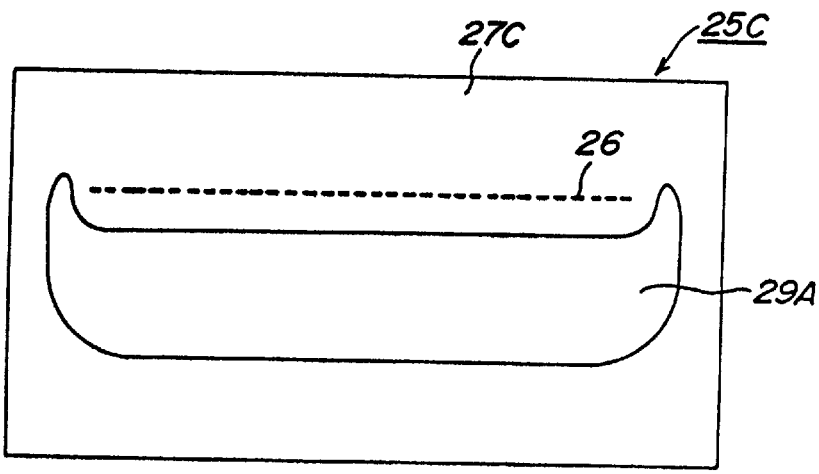
FIGS. 6a, 6b and 6c are schematic views depicting respectively positions of respective sintered bodies in the metal including member according to the invention.

In a metal including member 25C shown in FIG. 6a, an outer circumferential portion of the substrate member is formed by a lightbrown or white-yellow sintered body 27C, and a white or white-gray sintered body 29A is formed in the lightbrown or white-yellow sintered body 27C. The metal member 26 is included in the sintered body 27C. Also, in metal including member 25D or 25E shown in FIG. 6b or FIG. 6c, an outer circumferential portion of the substrate member is formed by a lightbrown or white-yellow sintered body 27D or 27E, and a white or white-gray sintered body 29B or 29C is formed in the sintered body 27D or 27E. The metal member 26 is included in the sintered body 27D or 27E. A volume of portion occupied by the white or white-gray sintered body (29A, 29B or 29C) is largest in the embodiment shown in FIG. 6b, while second largest is FIG. 6a and third largest is FIG. 6c.

Figure 7:
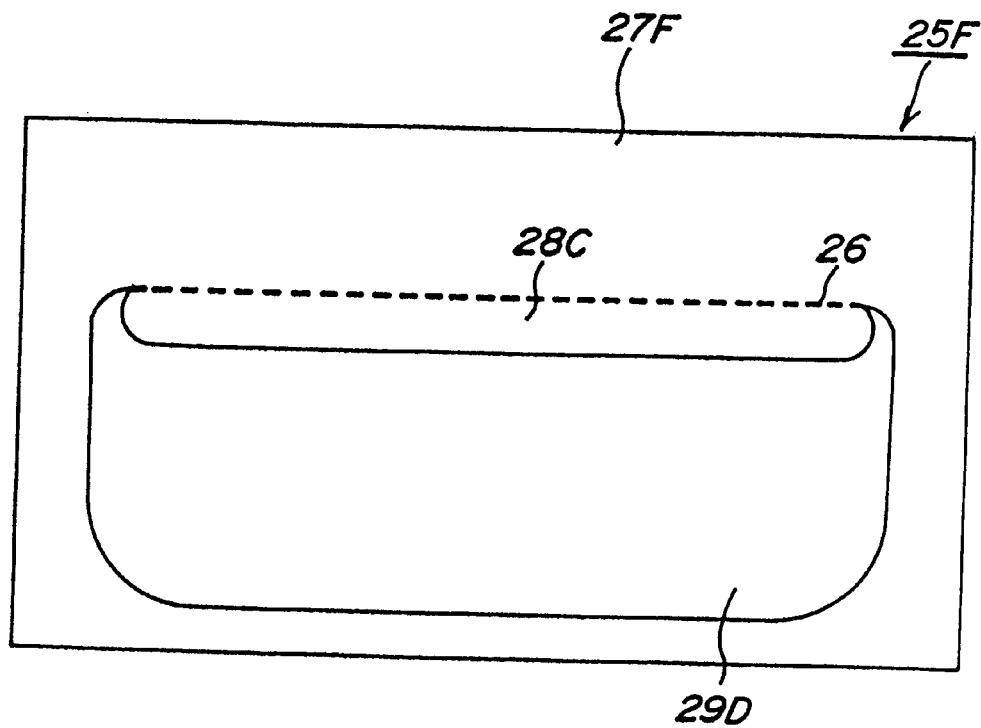
FIG. 7 is a schematic view showing positions of respective sintered bodies in the metal including member according to the invention.

In a metal including member 25F shown in FIG. 7, an outer circumferential portion of the substrate member is formed by a lightbrown or white-yellow sintered body 27F, and a white or white-gray sintered body 29D is formed in the sintered body 27F. A surface of the metal member 26 at the insulation dielectric layer side is brought into contact with the lightbrown or white-yellow sintered body 27F. A surface of the metal member 26 at the supporting portion side is brought into contact with a black-brown or black sintered body 28C which is continued to a white or white-gray sintered body 29D.

The lightbrown or white-yellow sintered body 27F mentioned above has a relative density of greater than 99.5%, a mean grain size of greater than 5 μm, a volume resistivity of $1\times10^9 \sim 1\times10^{12}$ Ω·cm, an amount of spin of greater than $5\times10^{12}$ spin/mg and a g-value of smaller than 2.000. Moreover, the crystal phase of the sintered body 27F is 27R phase. The sintered body 27F has characteristics similar to those of the lightbrown or white-yellow aluminum nitride sintered body mentioned above. However, since the crystal phase thereof is 27R phase and a mean grain size is little larger, there is a tendency that a volume resistivity is slightly decreased as compared with the aluminum nitride sintered body mentioned above.

In the aluminum nitride sintered body 27F, the microstructure and the electric characteristics thereof are substantially same as those of the aluminum nitride sintered body mentioned above, but a sintering proceeds slightly and a grain size becomes slightly larger. Therefore, it is assumed that a volume resistivity is decreased correspondingly and a crystal phase is varied.

The white or white-gray sintered body 29D has a volume resistivity at room temperature of greater than $8.6\times10^{13}$ Ω·cm, a g-value of unpaired electrons of smaller than 1.9981, and an amount of $9.5\times10$ spin/mg. Moreover, a relative density of the sintered body is smaller than 99.5% and is normally 97.5%~99.0%.

Therefore, in the white or white-gray sintered body 29D, ESR (Electron Spin Resonance) characteristics are substantially same as those of the lightbrown or white-yellow sintered body in which a volume resistivity is extremely decreased, but it is assumed that a volume resistivity is increased due to a generation of voids. Particularly, in the case of sintering in a high temperature, a vapor of inside CO gas and so on is generated in the second portion (supporting portion) which has a relatively larger volume, and thus voids are generated in the sintered body. Even if a microstructure of the sintered body is the same, a color of the sintered body looks like a black or a black-gray in the case of a low porosity and also looks like a white or white-gray in the case of a high porosity. The sintered body mentioned above sometimes includes 27R phase. However, whether 27R phase is included on not depends or a sintering temperature. If a sintering is performed in a high temperature, 27R phase is liable to be generated.

A g-value of upaired electrons and an amount of spin on a spectrum measured by the electron spin resonance method (ESR method) show a structure of defects in a crystal phase or a boundary of aluminum nitride.

This theory will be explained shortly. In the unpaired electrons under a magnetic field, an energy level is split due to Zeeman effect. This energy level reacts sensitively with a reciprocal action of an orbit movement of electrons and a nuclear magnetic efficiency of neighbor electrons. In the ESR method, it is possible to obtain information about an atom neighboring the upaired electrons or a chemical coupling and so on by measuring the split energy level.

In aluminum nitride, a g-value of upaired electrons of aluminum is varied corresponding to a crystal field in which upaired electrons exist. This g-value is 2.0000 theoretically in a free electron, and is 2.002316 after a relativity correction. Al atom and N atom in the aluminum nitride crystal has a wurtzite structure having four coordinations. Therefore, $SP^3$ hybridized orbital is constructed by one aluminum atom and three nitrogen atoms. It is known from an amount of spin of respective samples where unpaired electrons in the lattice defects exist in the crystal coordination or what kind of atoms exists near the unpaired electrons.

If a kind of atoms coupled with Al atom having unpaired electrons is varied, an amount of spin of the unparied electrons and a g-value are largely varied. A large variation of g-value is due to a variation of a kind of atoms coupled with aluminum. That is to say, if a kind of coupled atom is varied from nitrogen atom to carbon atom or aluminum atom, a g-value and an amount of spin is largely varied. In Si atom having four coordinates, it is reported that the same variation of spin amount occurs ("ESR estimation method of materials", IPC Publishing, page 57).

Remarkable variations of a g-value and an amount of spin obtained in this measurement are thought to be originated from a variation of a kind of atoms coupled with aluminum at for coordinations. That is to say, aluminum atom is coupled with aluminum atom.

Figure 8:
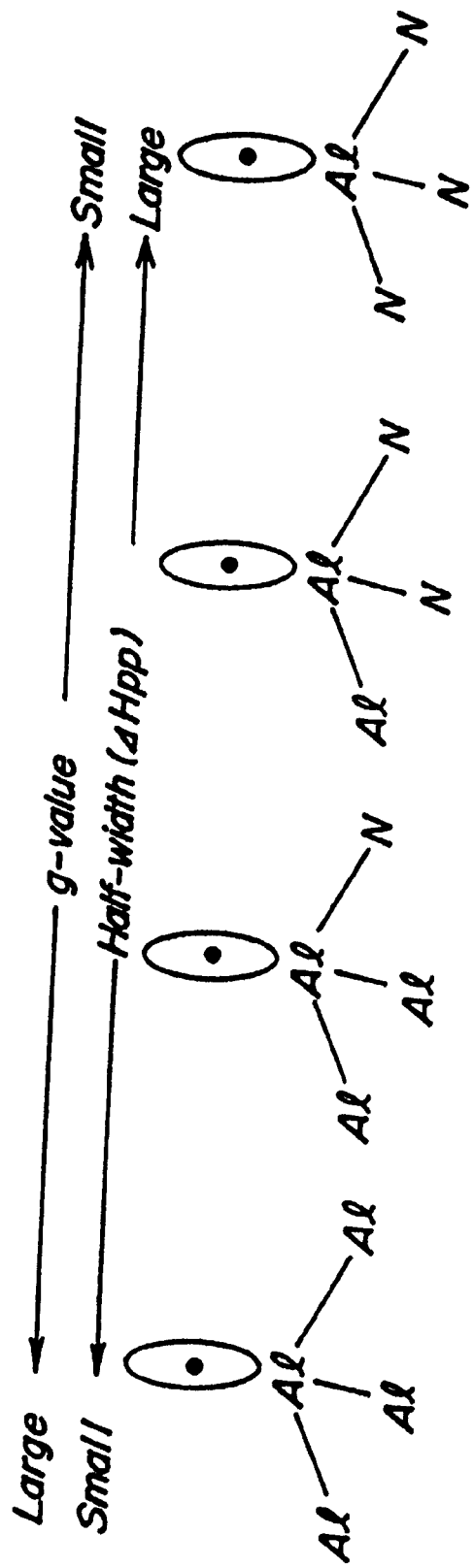
FIG. 8 is a schematic view for explaining a relation between a g-value of ESR spectrum and a coupling state of aluminum with the other elements.

As shown in FIG. 8, in the case that three nitrogen atoms are coupled with aluminum, if the nitrogen atoms coupled with aluminum are substituted by aluminum a g-value becomes larger and a half-width becomes smaller i.e. a width of peak becomes smaller and the peak becomes sharp.

It is understood that a g-value is varied if the number of nitrogen atoms coupled with aluminum is varied. Here, since carbon atoms and oxygen atoms exist in the aluminum nitride crystal phase, it is assumed that a carbon atom or an oxygen atom is substituted by a nitrogen atom. If a carbon atom or an oxygen atom is substituted by a nitrogen atom, a g-value is decreased is and thus a substitution rate of atoms should be extremely low.

In the lightbrown or white-yellow sintered body, a g-value of peak is smaller than 2.0000. In addition, the peak is broad and a half-width is large. In the sintered body mentioned above, it is assumed that an oxygen is solid-soluted in the aluminum nitrogen crystal i.e. $O^{2-}$ is substituted at $N^{3-}$ site and $Al^{3+}$ is removed.

If an absorption peak on ESR spectrum of respective sintered body is compared with each other, the lightbrown and white-yellow sintered body has the largest absorption strength and has a wide half-width. It is assumed that the largest conductive electron are trapped or collected in the lattice defects mentioned above and the thus trapped or collected conductive electrons are contributed to a decrease of electric resistance.

In order to further make clear the reason, the inventors measured a cathode luminescence spectrum with respect to the lightbrown or white-yellow sintered body.

Figure 9:
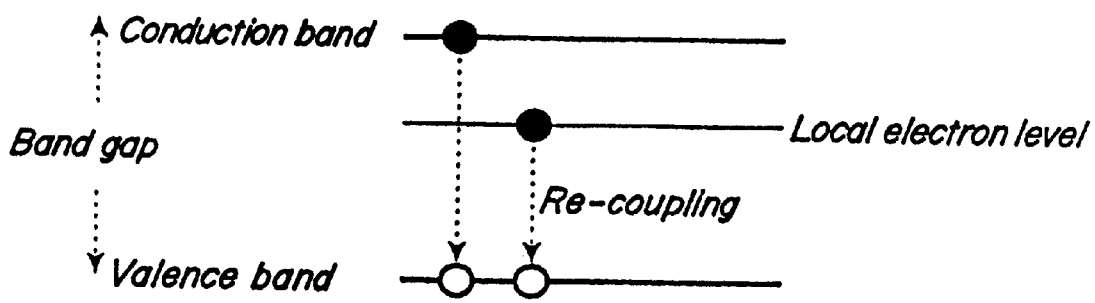
FIG. 9 is a schematic view for explaining a theory of a cathode luminescence.

A cathode luminescence is generally one kind of reflection waves from a specimen to which electrons are emitted. As shown in FIG. 9 as a schematic view, an excitation electron is exited from a valence band to a conduction band and a positive hole is generated in the valence band. In this case, an emission luminescence corresponding a band gap between the conduction band and the positive holes in the valence band. In addition, if a local electron level other than the conduction band is generated due to a function of defects or impurities included in the crystal, an emission luminescence due to a re-coupling of exited electrons in the local electron level with the positive holes in the valence band is also generated. Therefore, it is possible to obtain information about a crystal property and the defects and impurities included in the crystal from the cathode luminescence spectrum.

Figure 11:
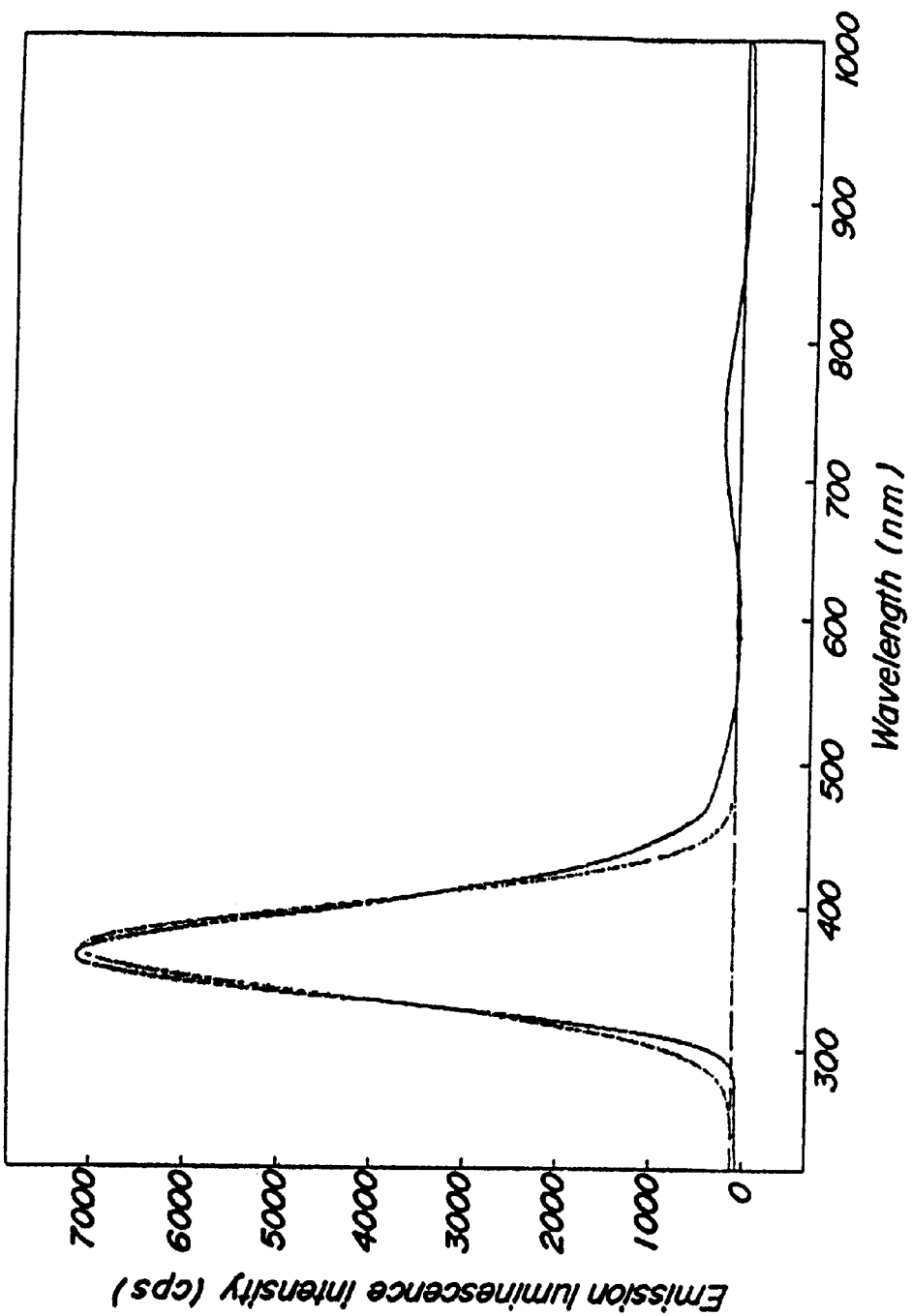
FIG. 11 is a graph showing a measured cathode luminescence spectrum of an aluminum nitride sintered body according to the invention.

A cathode luminescence spectrum of the lightbrown or white-yellow sintered body was measured. As a result, as shown in FIG. 11, it is understood that a strong peak exists in a wavelength range of 350~370 nm. Moreover, a weak peak, which is assumed as a double multiple wave of the strong peak, is detected in a wavelength range of 650~750 nm.

Figure 13:
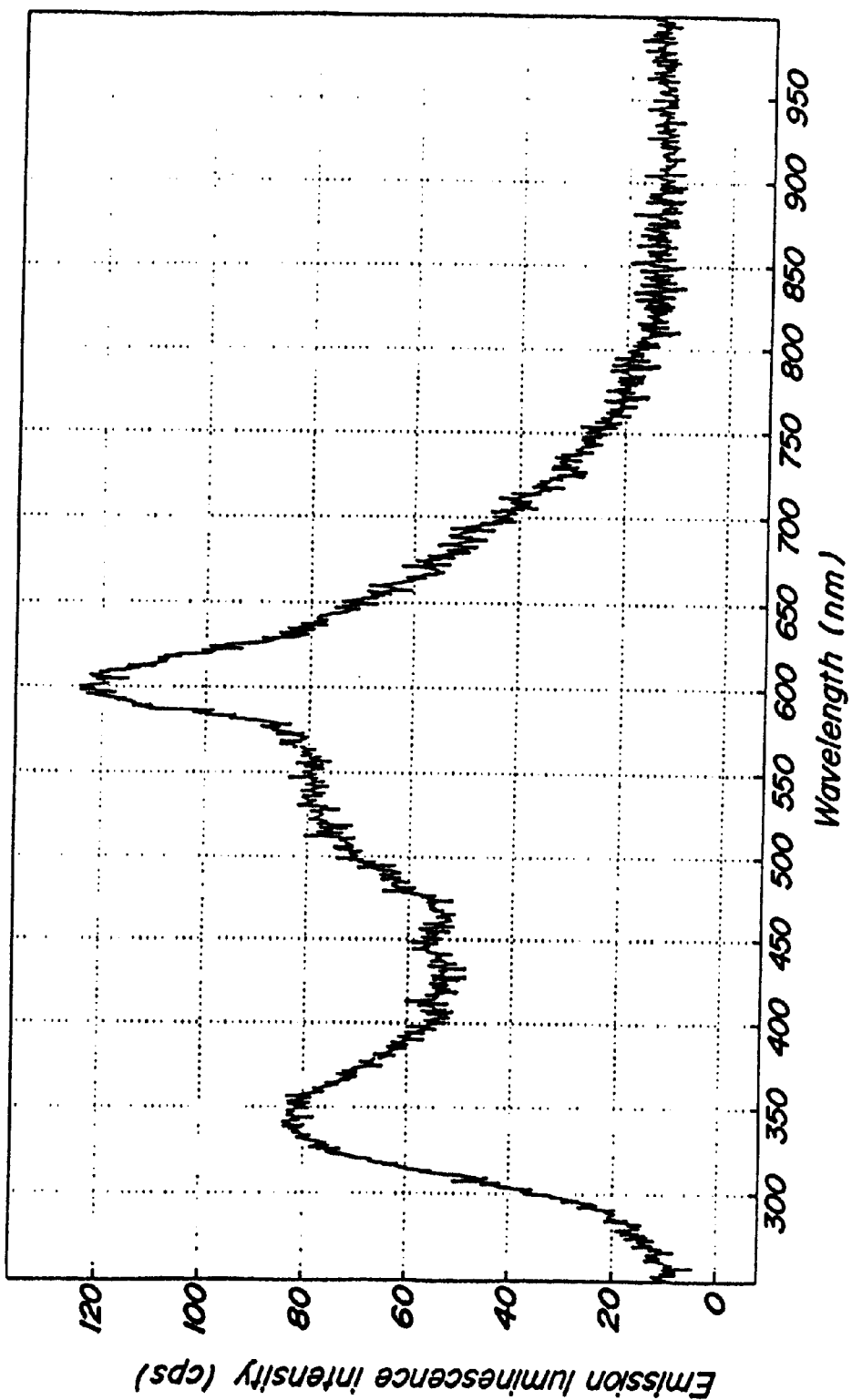
FIG. 13 is a graph depicting a measured cathode luminescence spectrum of an aluminum nitride sintered body, in which 5 wt % of yttria is added, according to a comparative example.

Further, as a comparative example, a cathode luminescence spectrum was measured with respect to a highly densified sintered body obtained by adding 5 wt % of yttria powders to aluminum nitride powders to obtain a mixture and sintering the thus obtained mixture. As a result, as shown in FIG. 13, weak peaks are detected at wavelengths of about 340 nm, 500 nm and 600 nm.

Such a difference of emission luminescence wavelength shows a difference of a kind of emission luminescence i.e. an electron level in the band gap. Moreover, a difference of emission luminescence intensity shows a difference of electron density due to impurities. Particularly, in the lightbrown or white-yellow sintered body, a strong and sharp peak is observed in a wavelength of 350~370 nm. This shows that an electron density is high with respect to a particular impurity.

Moreover, a mapping of emission luminescence having a wavelength of 360 nm measured by a cathode luminescence was performed with respect to the lightbrown or white-yellow sintered body. As a result, it is understood that the emission luminescence having a wavelength of 360 nm is observed in the aluminum nitride grain. The grain boundary thereof is dark and such emission luminescence is not observed. This shows that as a region of high electron density i.e. a region in which a number of local electron levels exist is distributed in the grain but in the grain boundary.

Moreover, a measurement of a distribution of oxygen density was performed by X-ray microanalyzer (EPMA) with respect to the lightbrown or white-yellow sintered body. As a result, relatively large amount of oxygen atoms exist in the grain. On the other hand, in the sintered body for a comparison in which 5 wt % yttria is added, an oxygen concentration is gradually decreased. In addition, a region of the sintered body for a comparison in which relatively large amount of oxygen atoms exist is substantially equal to a region in which yttria exists. It is known that yttria is not solution-soluted in the aluminum nitride grain and is discharged into the grain boundary. Therefore, almost all the oxygen atoms exist in the grain boundary but in the grain.

As can be understood from the experimental results mentioned above, it is assumed that, in the lightbrown or white-yellow sintered body, a relatively large amount of oxygen atoms are solid-soluted in the aluminum nitride grain, and this provide a local electron level, thereby contributing to a decrease of resistance in the grain. This result corresponds to the result in which a strong absorbing peak is detected in ESR spectrum.

On the other and, in the sintered body for a comparison in which 5 wt % of yttria is added, yttrium is discharged from the grain during a proceeding of sintering step, and the discharged yttria functions to carry oxygen atoms away into the grain boundary. Therefore, it is assumed that an amount of oxygen atoms in the grain is decreased.

The sintered body according to the invention is preferably produced by preparing a formed body made of aluminum nitride powders, including the formed body in a carbon film, and sintering it. The sintering can be performed by a hot press method or a hot isostatic press method.

Figure 10:
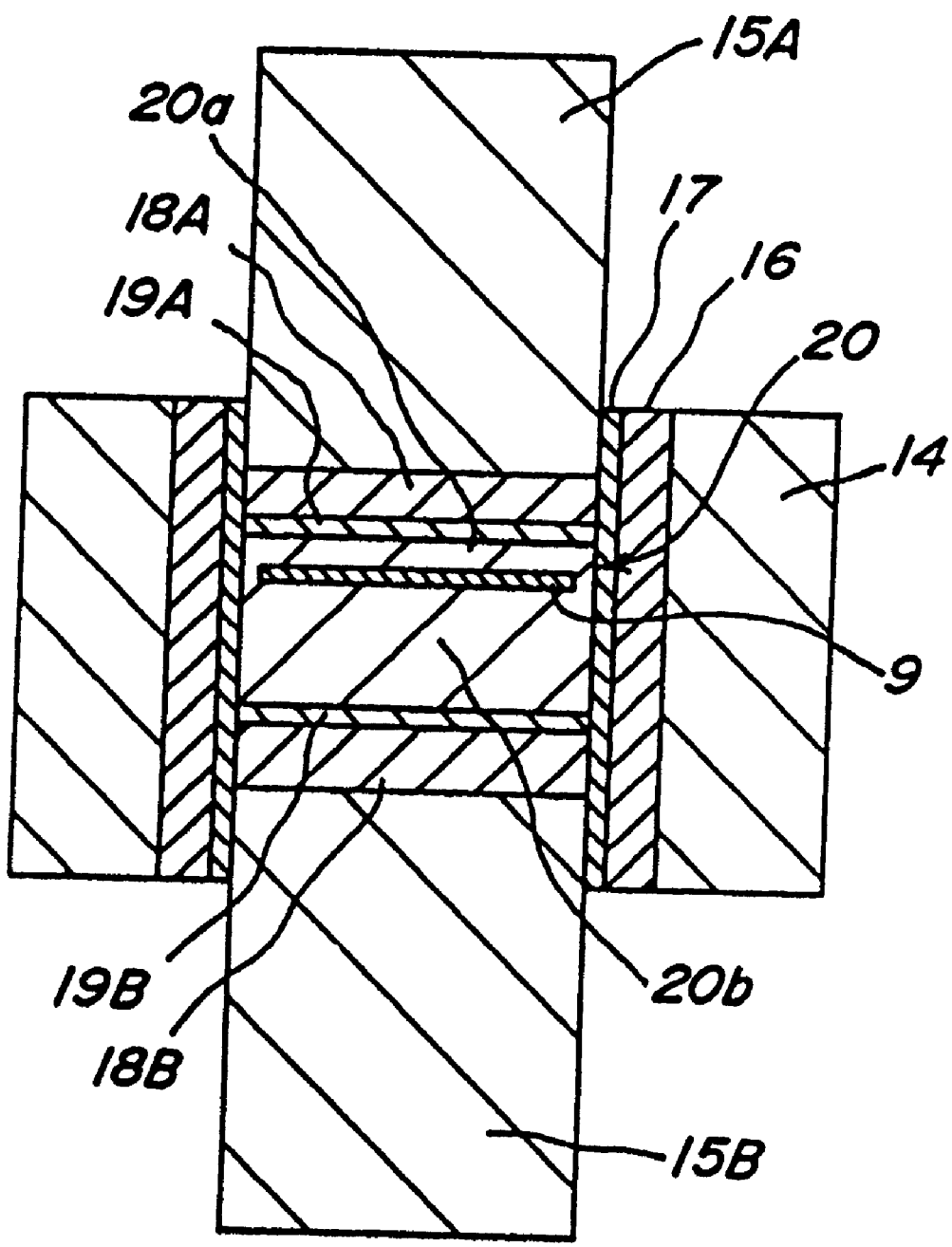
FIG. 10 is a cross sectional view for explaining a hot press method used preferably for producing a metal including member according to the invention.

In order to include the formed body in the carbon film, it is possible to perform the following method. As shown in FIG. 10, the plate-like metal bulk member 9 is embedded in a formed body 20, and the formed body 20 is divided into a first portion 20a and a second portion 20b by the metal bulk member 9. As mentioned above, a thickness of the first portion 20a is smaller than that of the second portion 20b.

When the formed body 20 is set between an upper punch 15A and a lower punch 15B, foils 19A and 19B made of graphite are set on an upper surface and a lower surface of the formed body 20 respectively. The formed body 20 and the foils 19A and 19B are arranged between spacers 18A and 18B. Moreover, a foil 17 made of graphite is arranged so as to cover a side surface of the formed body 20. In this manner, the formed body 20 is sealed up by the foils 19A, 19B and 17 made of graphite. Then, the foil 17 and the formed body 20 are set in a die 14 made of carbon via a sleeve 16 made of carbon. Pressures are applied to the formed body 20 in the die 14 upwardly and downwardly in FIG. 10 by using the lower punch 15B and the upper punch 15A, and the die 14 is heated for sintering.

In this case, a pressure during the sintering step is set to greater than 50 kg/cm². Moreover, from the view point of the apparatus ability, it is preferred to set this pressure smaller than 0.5 ton/cm².

In the embodiments mentioned above, it is understood that, when the highly purified aluminum nitride formed body in which the metal member is embedded is sintered integrally, it is possible to obtain the aluminum nitride sintered body in which a volume resistivity is extremely decreased at the first portion in which a length between the metal member and a surface of the sintered body is relatively short. Further, the inventors tried to produce an aluminum nitride sintered body by preparing a formed body made of aluminum nitride sintered body without embedding the metal member therein, and sintering the thus prepared formed body. In this case, the sintering step is performed under a condition such that a sintering temperature is 1850° C.~2000° C., a pressure is 100~300 kg/cm² and a keep time at a sintering temperature is 2~5 hours.

As a result, a volume resistivity of this aluminum nitride sintered body is $2 \times 10^{13}$ Ω·cm at a lowest one, and an extreme decrease of volume resistivity can not be observed.

Moreover, the inventors tried to produce an aluminum nitride sintered body having a relative density of greater than 95.0% by forming aluminum nitride raw materials having an amount of metal elements other than aluminum of smaller than 100 ppm to obtain a formed body, and sintering the thus obtained formed body under a condition that a sintering temperature is 1700° C.~2000° C. and a pressure is greater than 100 kg/cm². The sintered body thus produced has a black-brown color, and a volume resistivity thereof is in a range of $2 \times 10^{13}$ ~ $1 \times 10^{15}$ Ω·cm. Then, the sintered body was subjected to a heat treatment with no pressure under a non-active atmosphere and a temperature of more than 1850° C. As a result, it is found that a color of the aluminum nitride sintered body is changed into a lightbrown and a volume resistivity is extremely decreased to a level smaller than $1.0 \times 10^{13}$ Ω·cm. According to the producing method mentioned above, it is possible to obtain the aluminum nitride sintered body, in which a volume resistivity is remarkably decreased, from a single body without using a sandwiched metal member.

In this case, it is preferred to perform the heat treatment under an inert atmosphere or a reduction atmosphere. As such an atmosphere, it is further preferred to use a nitrogen atmosphere or an argon atmosphere.

Therefore, the aluminum nitride sintered body according to the invention can be applied to suscepter for holding a semiconductor wafer, dummy wafer, shadow ring, tube for generating a high frequency plasma, dome for generating a high frequency plasma, high frequency transmitting window, lift pin for supporting the semiconductor wafer, substrate of semiconductor manufacturing apparatuses such as a shower plate and so on.

Embodiment 1

The electrostatic chuck having the constructions shown in FIG. 1 and FIG. 2 was manufactured. In this case, use was made of aluminum nitride powders obtained by a reduction nitridized method. In the aluminum nitride powders mentioned above, the amount of Si, Fe, Ca, Mg, K, Na, Cr, Mn, Ni, Cu, Zn, W, B or Y was smaller than 100 ppm respectively, and no other metal component other than aluminum was detected.

The preliminary formed body having a disc shape was manufactured by forming the raw materials uni-axially under pressure. As the electrode, use was made of the metal net made of molybdenum. As the metal net, use was made of a molybdenum wire having a diameter of 0.12 mm and a density of the metal net was 50 per 1 inch. The metal net mentioned above was embedded in the preliminary formed body to manufacture the formed body 20 shown in FIG. 10. As shown in FIG. 10, the formed body 20 was set in the die, and the formed body 20 was sealed by the carbon foil as mentioned above. The formed body 20 was sintered by the hot press method under the condition of sintering temperature of 1950° C., pressure of 200 kg/cm² and keep time of 2 hours to obtain the sintered body.

A surface of the thus obtained sintered body which faces the insulation dielectric layer was machined so as to make a thickness of the insulation dielectric layer 1 mm. The hole 2 was formed in the sintered body from a rear side by a machining center. The terminal 10 was connected to the electrode 9. Relative densities of the supporting portion 8 and the aluminum nitride sintered body, which constitutes the insulation dielectric layer 4, were larger than 98.0%. The electrostatic chuck thus obtained had a diameter of 200 mm and a thickness of 8 mm.

Specimens were cut out from various portions of the electrostatic chuck thus obtained so as to perform the analysis. At first, a color of the insulation dielectric layer 4 was a white-yellow. On the other hand, a color of the supporting portion 8 was a black or black-brown. The analysis results about a crystal structure and a crystal phase of respective portions were the same as those mentioned above.

Moreover, a volume resistivity of the sintered body, which constructs the insulation dielectric layer 4, was $8.9 \times 10^{10}$ Ω·cm, and it was confirmed that a volume resistivity is extremely decreased. On the other hand, a volume resistivity of the black or black-brown sintered body, which constructs the supporting portion 8, was $2.6 \times 10^{13}$ ~ $2.8 \times 10^{13}$ Ω·cm, and it was confirmed that a volume resistivity thereof is remarkably greater than that of the insulation dielectric layer 4.

Further, ESR spectrum was measured with respect to the specimens cut out from the insulation dielectric layer 4 and the supporting portion 8. As a result, a g-value of the supporting portion 8 on ESR spectrum was 2.0053±0.0001, and the peak thereof was strong and sharp. On the other hand, a g-value of the insulation dielectric layer 4 was 1.9980±0.0001, and the peak thereof was strong and broad.

Moreover, a chucking property of the electrostatic chuck was measured prior to the specimen cut out. A metal disc having an area of 1 cm² of the semiconductor wafer 6 shown in FIG. 1, and it was pulled up perpendicularly with respect to a chucking surface by a wire. Then, a load necessary for detaching the metal disc from the electrostatic chuck was measured by a load cell. As a result, a high chucking property of greater than 100 g/cm² could be obtained when a voltage of 500 V was applied.

Further, a volume resistivity at 300° C. of the is aluminum sintered body, which constructs the insulation dielectric layer 4, was measured. As a result, a volume resistivity at 300° C. was $5.0 \times 10^7$ Ω·cm.

Embodiment 1A

As is the same as the embodiment 1, the electrostatic chuck was manufactured. However, a pressure applied to the formed body was set to 100 kg/cm² and the other conditions were same as those of the embodiment 1.

Also in this embodiment, the sintered bodies were cut out from various portions of the substrate member which constructs the electrostatic chuck, and the analysis for respective sintered bodies was performed. In this case, colors of the cut out sintered bodies were different as shown in FIG. 7. A relative density of the white-yellow sintered body 27F was 99.8%, and a volume resistivity thereof at room temperature was $8.9 \times 10^{10}$ Ω·cm. Moreover, an amount of spin thereof on ESR spectrum was $1.1 \times 10^{13}$ spin/mg, and a g-value thereof on ESR spectrum was 1.9980.

On the other hand, a relative density of the white sintered body 29D was 97.8%, and a volume resistivity thereof at room temperature was $2.3 \times 10^{14}$ Ω·cm. Moreover, an amount of spin thereof on ESR spectrum was $1.3 \times 10^{13}$ spin/mg, and a g-value thereof on ESR spectrum was 1.9978. Further, it was confirmed that the black sintered body 28C was connected to the electrode 26.

COMPARATIVE EXAMPLE 1

As is the same as the embodiment 1, the electrostatic chuck was manufactured. In this case, a temperature during hot press was set to 1800° C., a pressure was set to 150 kg/cm², and a keep time at 1800° C. was set to 3 hours. The other conditions were same as those of the embodiment 1. As a result, it was confirmed that overall substrate member was constructed by the black sintered body. Then, the sintered bodies were cut out from various portions of the substrate member, and properties thereof were measured.

A relative density of the sintered body cut out from the insulation dielectric layer 4 was greater than 99.0%, and a volume resistivity thereof was $6.0 \times 10^{13}$ Ω·cm. Moreover, an amount of spin thereof was $1.2 \times 10^{12}$ spin/mg, and a g-value thereof was 2.0049. A relative density of the sintered body cut out from the supporting portion 8 was greater than 99.0%, and a volume resistivity thereof was $3.0 \times 10^{14}$ Ω·cm. Further, an amount of spin thereof was $2.5 \times 10^{12}$ spin/mg, and a g-value thereof was 2.0062. When a voltage of 500 V was applied to the electrostatic chuck, a chucking property was 3 g/cm$^2$.

COMPARATIVE EXAMPLE 2

As is the same as the embodiment 1, the electrostatic chuck was manufactured. In this case, a temperature during hot press was set to 1800° C., a pressure was set to 200 kg/cm$^2$, and a keep time at 1800° C. was set to 3 hours. The other conditions were same as those of the embodiment 1. As a result, it was confirmed that overall substrate member was constructed by the black sintered body.

A relative density of the sintered body cut out from the insulation dielectric layer 4 was greater than 99.5%, and a volume resistivity thereof was $4.0 \times 10^{13}$ Ω·cm. Moreover, an amount of spin thereof was $2.1 \times 10^{12}$ spin/mg, and a g-value thereof was 2.0047. A relative density of the sintered body cut out from the supporting portion 8 was greater than 99.0%, and a volume resistivity thereof was $4.2 \times 10^{14}$ Ω·cm. Further, an amount of spin thereof was $1.2 \times 10^{12}$ spin/mg, and a g-value thereof was 2.0061. When a voltage of 500 V was applied to the electrostatic chuck, a chucking property was 2 g/cm$^2$.

Embodiment 2

As is the same as the embodiment 1, the electrostatic chuck was manufactured. In this case, a temperature during hot press was set to 1850° C., a pressure was set to 200 kg/cm$^2$, and a keep time at 1850° C. was set to 5 hours. The other conditions were same as those of the embodiment 1. As a result, the substrate member having a distribution of the sintered bodies shown in FIG. 5a could be obtained.

A color of the sintered body 27A cut out from the insulation dielectric layer 4 was a lightbrown. A relative density of the sintered body 27A was greater than 99.5%, and a volume resistivity thereof was $8.0 \times 10^{12}$ Ω·cm. Moreover, an amount of spin thereof was $6.9 \times 10^{12}$ spin/mg, and a g-value thereof was 1.9990. A color of the sintered body 28A cut out from the supporting portion 8 was a black-brown. A relative density of the sintered body 28A was greater than 99.0%, and a volume resistivity thereof was $2.3 \times 10^{13}$ Ω·cm. Moreover, an amount of spin thereof was $4.2 \times 10^{12}$ spin/mg, and a g-value thereof was 2.0051. When a voltage of 500 V was applied to the electrostatic chuck, a chucking property was 90 g/cm$^2$.

Embodiment 3

As is the same as the embodiment 1, the electrostatic chuck was manufactured. In this case, a temperature during hot press was set to 1900° C., a pressure was set to 200 kg/cm$^2$, and a keep time at 1900° C. was set to 3 hours. The other conditions were same as those of the embodiment 1. As a result, the substrate member having a distribution of the sintered bodies shown in FIG. 5a could be obtained.

A color of the sintered body 27A cut out from the insulation dielectric layer 4 was a lightbrown. A relative density of the sintered body 27A was greater than 99.5%, and a volume resistivity thereof was $2.0 \times 10^{12}$ Ω·cm. Moreover, an amount of spin thereof was $7.5 \times 10^{12}$ spin/mg, and a g-value thereof was 1.9985. A color of the sintered body 28A cut out from the supporting portion 8 was a black-brown. A relative density of the sintered body 28A was greater than 99.0%, and a volume resistivity thereof was $8.0 \times 10^{13}$ Ω·cm. Moreover, an amount of spin thereof was $3.3 \times 10^{12}$ spin/mg, and a g-value thereof was 2.0042. When a voltage of 500 V was applied to the electrostatic chuck, a chucking property was 120 g/cm$^2$.

Embodiment 4

As is the same as the embodiment 1, the electrostatic chuck was manufactured. In this case, a temperature during hot press was set to 1900° C., a Os pressure was set to 100 kg/cm$^2$, and a keep time at 1900° C. was set to 5 hours. The other conditions were same as those of the embodiment 1. As a result, the substrate member having a distribution of the sintered bodies shown in FIG. 5b could be obtained.

A color of the sintered body 27B cut out from the insulation dielectric layer 4 was a lightbrown. A relative density of the sintered body 27B was greater than 99.0%, and a volume resistivity thereof was $3.0 \times 10^{11}$ Ω·cm. Moreover, an amount of spin thereof was $1.1 \times 10^{13}$ spin/mg, and a g-value thereof was 1.9979. A color of the sintered body 28B cut out from the supporting portion 8 was a black-brown. A relative density of the sintered body 28B was greater than 99.0%, and a volume resistivity thereof was $9.0 \times 10^{13}$ Ω·cm. Moreover, an amount of spin thereof was $3.5 \times 10^{12}$ spin/mg, and a g-value thereof was 2.0051. When a voltage of 500 V was applied to the electrostatic chuck, a chucking property was 200 g/cm$^2$.

Embodiment 5

As is the same as the embodiment 1, the electrostatic chuck was manufactured. In this case, a temperature during hot press was set to 2000° C., a pressure was set to 200 kg/cm$^2$, and a keep time at 2000° C. was set to 1 hour. The other conditions were same as those of the embodiment 1. As a result, the substrate member having a distribution of the sintered bodies shown in FIG. 6a could be obtained.

A color of the sintered body 27C cut out from the insulation dielectric layer 4 was a lightbrown. A relative density of the sintered body 27C was greater than 99.5%, and a volume resistivity thereof was $3.0 \times 10^{11}$ Ω·cm. Moreover, an amount of spin thereof was $8.2 \times 10^{12}$ spin/mg, and a g-value thereof was 1.9979. A color of the sintered body 29A cut out from the supporting portion 8 was a white. A relative density of the sintered body 29A was greater than 98.3%, and a volume resistivity thereof was $1.9 \times 10^{14}$ Ω·cm. Moreover, an amount of spin thereof was $9.5 \times 10^{12}$ spin/mg, and a g-value thereof was 1.9980. When a voltage of 500 V was applied to the electrostatic chuck, a chucking property was 200 g/cm$^2$. Such a generation of the white sintered body is thought to be due to voids generated due to a high sintering temperature of 2000° C.

Embodiment 6

As is the same as the embodiment 1, the electrostatic chuck was manufactured. In this case, a temperature during hot press was set to 2000° C., a pressure was set to 100 kg/cm$^2$, and a keep time at 2000° C. was set to 3 hours. The other conditions were same as those of the embodiment 1. As a result, the substrate member having a distribution of the sintered bodies shown in FIG. 6b could be obtained.

A color of the sintered body 27D cut out from the insulation dielectric layer 4 was a lightbrown. A relative density of the sintered body 27D was greater than 99.5%, and a volume resistivity thereof was $1.1 \times 10^{11}$ Ω·cm. Moreover, an amount of spin thereof was $1.1 \times 10^{13}$ spin/mg, and a g-value thereof was 1.9961. A color of the sintered body 29B cut out from the supporting portion 8 was a white.

A relative density of the sintered body 29B was greater than 97.9%, and a volume resistivity thereof was $8.6 \times 10^{13}$ Ω·cm. Moreover, an amount of spin thereof was $1.1 \times 10^{13}$ spin/mg, and a g-value thereof was 1.9975. When a voltage of 500 V was applied to the electrostatic chuck, a chucking property was 190 g/cm². Since a pressure during hot press was small as compared with the embodiment 5, it is thought that a region of the white sintered body is increased.

Embodiment 7

As is the same as the embodiment 1, the electrostatic chuck was manufactured. In this case, a temperature during hot press was set to 2000° C., a pressure was set to 150 kg/cm², and a keep time at 2000° C. was set to 5 hours. The other conditions were same as those of the embodiment 1. As a result, the substrate member having a distribution of the sintered bodies shown in FIG. 6c could be obtained.

A color of the sintered body 27E cut out from the insulation dielectric layer 4 was a lightbrown. A relative density of the sintered body 27E was greater than 99.5%, and a volume resistivity thereof was $9.0 \times 10^9$ Ω·cm. Moreover, an amount of spin thereof was $2.1 \times 10^{13}$ spin/mg, and a g-value thereof was 1.9961. A color of the sintered body 29C cut out from the supporting portion 8 was a white. A relative density of the sintered body 29C was greater than 97.8%, and a volume resistivity thereof was $2.0 \times 10^{14}$ Ω·cm. Moreover, an amount of spin thereof was $1.2 \times 10^{13}$ spin/mg, and a g-value thereof was 1.9972. When a voltage of 500 V was applied to the electrostatic chuck, a chucking property was 250 g/cm².

Embodiment 8

The aluminum nitride sintered body was manufactured in the manner mentioned below. As a raw material, use was made of highly purified aluminum nitride powders obtained by a reduction nitriding method or a direct nitriding method. In the aluminum nitride powders, an amount of Si, Fe, Ca, Mg, K, Na, Cr, Mn, Ni, Cu, Zn, W, B or Y was smaller than 100 ppm respectively, and no other metal component other than aluminum was detected.

The formed body having a disc shape was manufactured by forming the aluminum nitride powders one-axially under pressure. Then, the thus obtained formed body was set in the die as shown in FIG. 10. In this case, no metal member was arranged in-the formed body. As is the same as the embodiment 1, the formed body was sealed by the carbon foil. Then, the formed body was sintered by the hot press method under the condition of sintering temperature of 1800° C., pressure of 200 kg/cm² and keep time of 2 hours to obtain an aluminum nitride specimen.

Then, the aluminum nitride specimen was subjected to a heat treatment. The heat treatment was performed in a nitrogen atmosphere under the condition of heat treatment temperature of 1900° C., and keep time at 1900° C. of 2 hours. As a result, the white-yellow aluminum nitride sintered body was obtained. A volume resistivity of this sintered body was $5 \times 10^{12}$ Ω·cm and a g-value thereof on ESR spectrum was 1.9990.

Embodiment 9

The electrostatic chuck having the constructions shown in FIG. 4 was manufactured. In this case, use was made of aluminum nitride powders obtained by a reduction nitriding method. In the aluminum nitride powders mentioned above, an amount of Si, Fe, Ca, Mg, K, Na, Cr, Mn, Ni, Cu, Zn, W, B or Y was smaller than 100 ppm respectively, and no other metal component other than aluminum was detected. As the metal net, use was made of a molybdenum wire having a diameter of 0.15 mm and a density of the metal net was 15 per 1 inch. The metal net mentioned above and the resistance heating member 21 made of molybdenum wire were embedded in the formed body. As shown in FIG. 10, the formed body was sintered by the hot press method under the condition of sintering temperature of 1900° C., pressure of 200 kg/cm² and keep time of 4 hours to obtain the sintered body.

A surface of the thus obtained sintered body which faces to the insulation dielectric layer was machined so as to make a thickness of the insulation dielectric layer 1 mm. The hole 2 was formed in the sintered body from a rear side by a machining center. The terminal 10 was connected to the electrode 9. Relative densities of the supporting portion 8 and the aluminum nitride sintered body, which constructs the insulation dielectric layer 4, were greater than 99.0%. The electrostatic chuck thus obtained had a diameter of 200 mm and a thickness of 12 mm. Moreover, the chucking property of the electrostatic chuck was measured as is the same as the embodiment 1. A power was supplied to the resistance heating member, and the chucking properties were measured from room Temperature to 300° C. by 100° C. intervals. As a result, the chucking property was in a range of 60~100 g/cm² at all the temperatures.

In the substrate member, a distribution of the sintered bodies was as shown in FIG. 5b. A color of the sintered body 27B cut out from the insulation dielectric layer was a lightbrown, and a relative density was greater than 99.5%. Moreover, a volume resistivity thereof was $5.0 \times 10^{12}$ Ω·cm at room temperature and $2.0 \times 10^8$ Ω·cm at 300° C. Further, an amount of spin thereof was $7.5 \times 10^{12}$ spin/mg, and a g-value thereof was 1.9965. A color of the sintered body 28B cut out from the supporting portion 8 was a black-brown. Moreover, a relative density thereof was greater than 99.0%, and a volume resistivity at room temperature was $1.1 \times 10^{13}$ Ω·cm. Further, an amount of spin thereof was $2.1 \times 10^{12}$ spin/mg, and a g-value thereof was 2.0044.

Embodiment 10

A volume resistivity at 300° C. was measured with respect to the aluminum nitride sintered bodies which construct respectively the insulation dielectric layers obtained in the embodiments 2~8 mentioned above. As a result, it was confirmed that a volume resistivity is decreased to $1 \times 10^8$~$1 \times 10^{10}$ Ω·cm.

Embodiment 11

As is the same as the embodiment 1, the electrostatic chuck was manufactured. In this case, a sintering temperature during hot press was set to 1,800° C., a pressure was set to 200 kg/cm², and a keep time at 1800° C. was set to 2 hours. The other conditions were same as those of the embodiment 1. Further, the thus obtained electrostatic chuck was subjected to a heat treatment. The heat treatment was performed in a nitrogen atmosphere under the condition of heat treatment temperature of 1900° C. and keep time at 1900° C. for 2 hours.

Figure 6B:
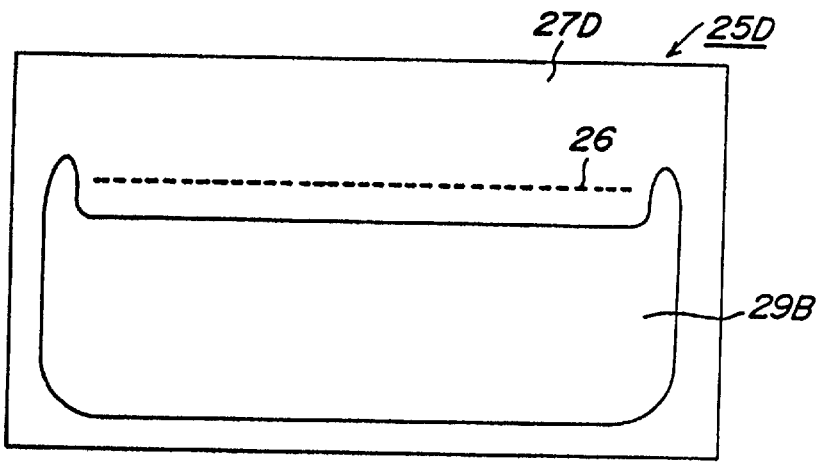
Figure 6C:
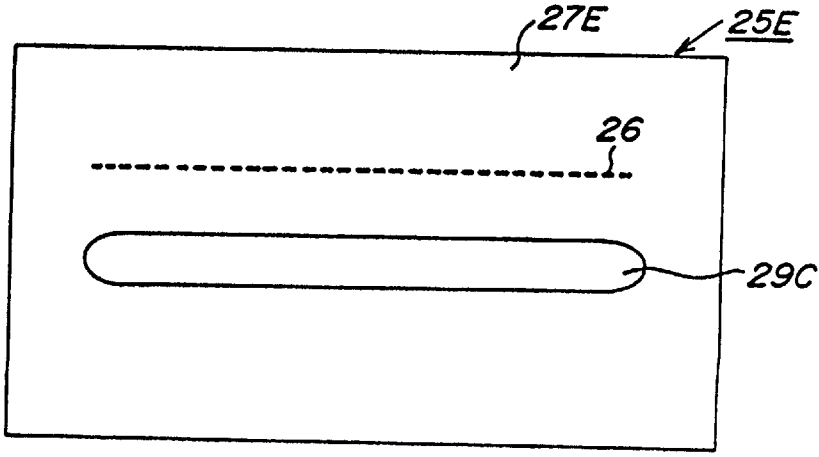

As a result, the substrate member having a distribution of the sintered bodies shown in FIG. 6c can be obtained. A color of the sintered body 27E cut out from the insulation dielectric layer 4 was a white-yellow. Moreover, a relative density thereof was greater than 99.5%, and a volume resistivity thereof was $5.0 \times 10^{12}$ Ω·cm. Further, an amount of spin thereof was $9.5 \times 10^{12}$ spin/mg, and a g-value thereof was 1.9981. When a voltage of 500 V was applied to the electrostatic chuck, a chucking property was 130 g/cm².

In the present invention, as shown in FIGS. 5~7, it is possible to improve a durability to a heat cycle by including the metal member (particularly electrode) in the aluminum nitride sintered body having a relative density of greater than 99.5%.

Moreover, in the metal including member, at least one part of the second portion can be constructed by the sintered body having a lower relative density than that of the first portion, preferably by the sintered body having a relative density of 97.5~99.5%. In this case, it is very easy to machine the second portion, and thus a manufacturing cost can be reduced. Particularly, as shown in FIGS. 6a, 6b, 6c, in the case that at least one part of the supporting portion in the substrate member was constructed by the white or white-gray sintered body having a relative density of 97.5~99.5%, it is easy to machine, in the supporting portion, a hole through which a terminal is arranged.

Embodiment 12

As is the same as the embodiment 1, the electrostatic chuck was manufactured. In this case, a temperature during hot press was set to 2000° C., a pressure was set to 200 kg/cm$^2$, and a keep time at 2000° C. was set to 4 hours. The other conditions were same as those of the embodiment 1. As a result, the substrate member having a distribution of the sintered bodies shown in FIG. 6a could be obtained.

A color of the sintered body 27c was a lightbrown. A relative density of the sintered body 27c was greater than 99.5%, and a volume resistivity thereof was $5.0 \times 10^{11}$ Ω·cm. Moreover, an amount of spin was $9.0 \times 10^{12}$ spin/mg and a g-value thereof was 1.9970.

Then, a surface of the sintered body was ground like a mirror by using a diamond paste, and a spectrum was measured by a cathode luminescence method.

The result is shown in FIG. 11. In FIG. 11, a vertical axis shows an emission luminescence intensity, and a horizontal axis shows a wavelength of luminescence. It is understood that a strong peak exists in a wavelength range of 350~370 nm and a weak peak exists in a wavelength range of 650~750 nm.

Figure 12:
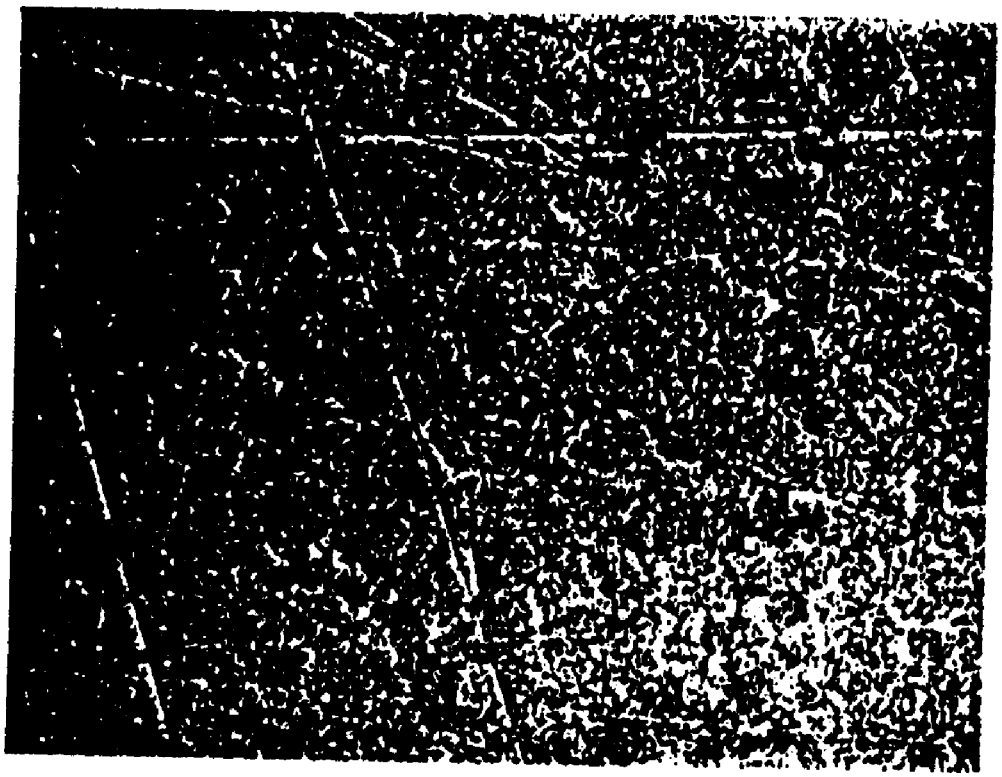
FIG. 12 is an SEM microphotograph illustrating a ceramics structure of the aluminum nitride sintered body according to the invention.

FIG. 12 is an SEM microphotograph showing a ceramic structure of the sintered body mentioned above.

Figure 15:
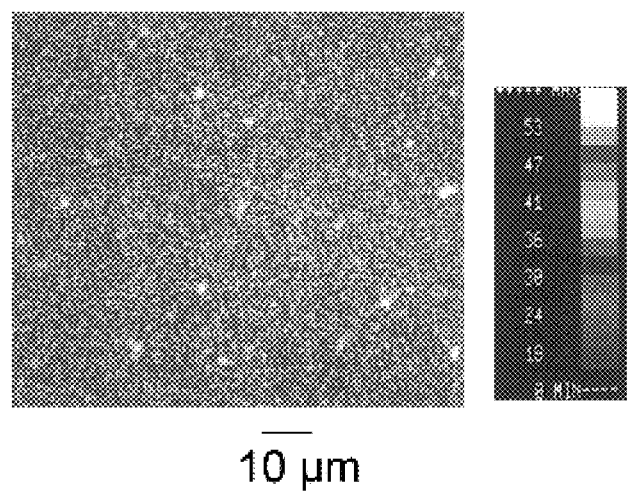
FIG. 15 is a color micrograph showing the distribution of oxygen concentration measured by an X-ray microanalyzer (EPMA) with respect to the sintered body of Embodiment 12 according to the present invention.

FIG. 15 shows the distribution of oxygen concentration measured by an X-ray microanalyzer (EPMA) with respect to the sintered body of Embodiment 12 according to the present invention. In particular, FIG. 15 shows the distribution of oxygen by color mapping. The color bar shown in FIG. 15 shows the relationship between color and oxygen concentration. Concentration of oxygen increases with the increasing order of the colors shown in the color bar, along the order of blue, green, yellow, red and white.

COMPARATIVE EXAMPLE 3

In this case, use was made of aluminum nitride powders obtained by a reduction nitriding method. In the aluminum nitride powders mentioned above, an amount of Si, Fe, Ca, Mg, K, Na, Cr, Mn, Ni, Cu, Zn, W. B or Y was smaller than 100 ppm respectively, and no other metal component other than aluminum was detected. Then, 95 wt % of aluminum nitride powders was mixed with 5 wt % of yttria to obtain mixed powders. The preliminary formed body having a disc shape was manufactured by forming the mixed powders one-axially under pressure. The thus obtained preliminary formed body was set in the die and was sintered at 1950° C. for 4 hours to obtain the sintered body.

A color of the sintered body was a lightbrown. A relative density thereof was greater than 99.5%, and a volume resistivity was $8.7 \times 10^{12}$ Ω·cm. Moreover, an amount of spin was $3.8 \times 10^{11}$ spin/mg, and a g-value thereof was 2.007.

Then, a surface of the sintered body was ground like a mirror by using a diamond paste, and a spectrum was measured by a cathode luminescence method.

The result is shown in FIG. 13. In FIG. 13, a weak peak exists at a wavelength of about 340 nm, 500 nm or 600 nm.

Figure 14:
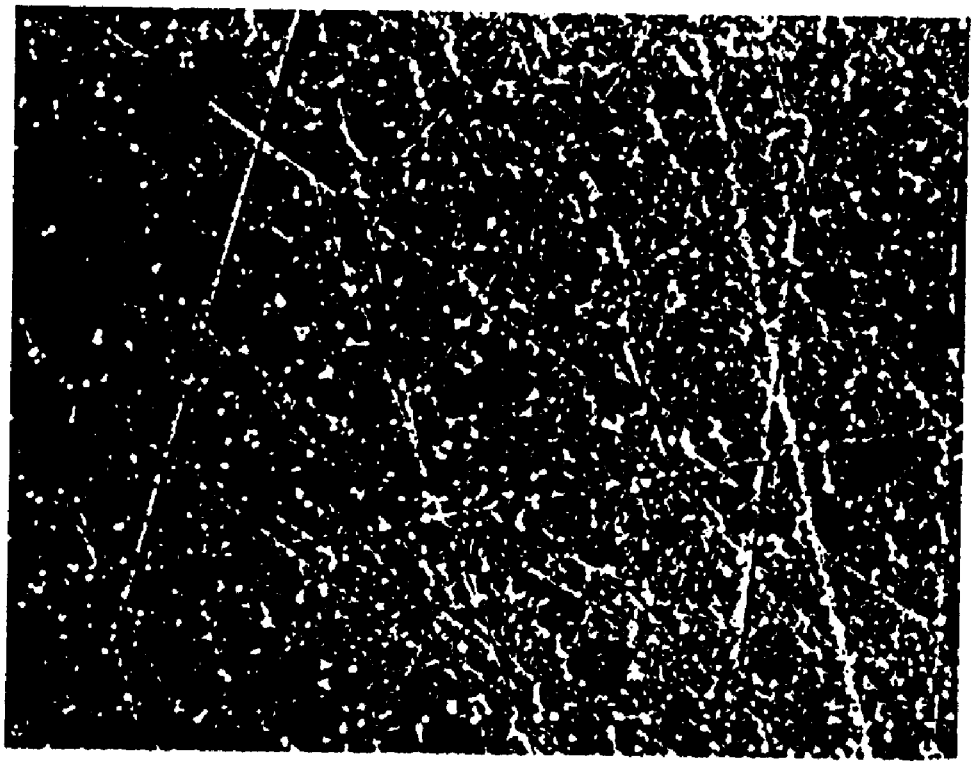
FIG. 14 is an SEM microphotograph showing a ceramics structure of the aluminum nitride sintered body, in which 5 wt % of yttria is added, according to the comparative example.

FIG. 14 is an SEM microphotograph showing a ceramic structure of the sintered body mentioned above.

Moreover, a distribution of oxygen concentration and a distribution of yttrium atom were measured by an X-ray microanalyzer (EPMA) with respect to the sintered bodies obtained in the embodiment 12 and the comparative example 3. As a result, in the sintered body of the comparative example 3 to which 5 wt % of yttria is added, an oxygen concentration was decreased relatively. Moreover, a portion of the sintered body, at which a large number of oxygen atoms exist, was substantially equal to a portion at which yttria exists. This portion was substantially identical with the grain boundary shown in a microphotograph in FIG. 14.

As mentioned above, according to the invention, in the metal including member in which the metal member is embedded in the substrate member made of aluminum nitride, it is possible to obtain the aluminum nitride sintered body and the electrostatic chuck which can control a volume resistivity of the metal including member without adding a low resistance material in aluminum nitride.

Figure 16:
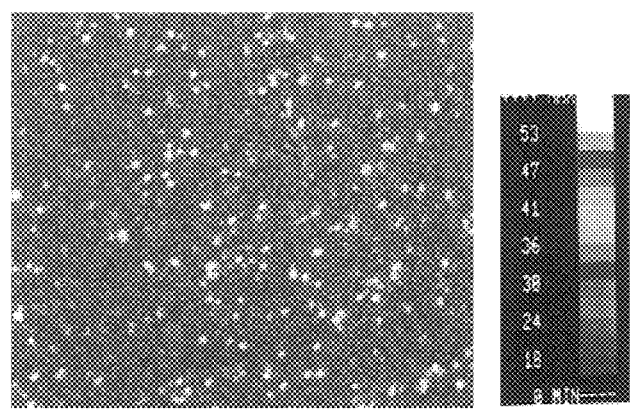
FIG. 16 is a color micrograph showing the distribution of oxygen concentration measured by an X-ray micronanalyzer (EPMA) with respect to the sintered body of Comparative Example 3.
Figure 17:
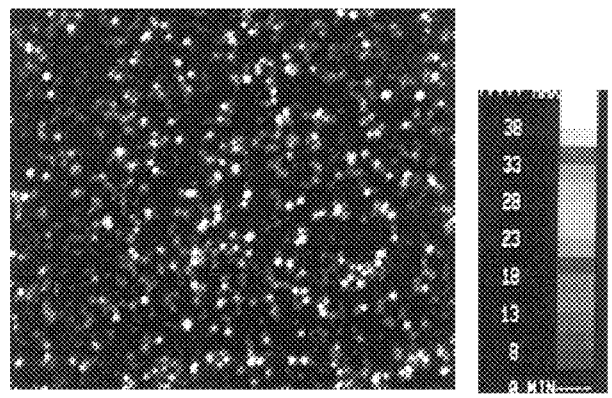
FIG. 17 is a color micrograph showing the distribution of yttrium concentration measured by an X-ray microanalyzer with respect to the sintered body of Comparative Example 3.

FIGS. 16 and 17 are color micrographs showing the distribution of oxygen concentration and distribution of yttrium concentration, respectively, measured by an X-ray microanalyzer (EPMA) with respect to the sintered body of Comparative Example 3.

FIGS. 16 and 17 show the distribution of oxygen and yttrium by color mapping. In particular, the color bars of each of FIGS. 16 and 17 depict increasing concentration of oxygen and yttria according to the order of colors shown. Particularly, concentration of oxygen and yttria increases with the increasing order of colors, blue, green, yellow, red and white. The distribution of the respective element concentrations shown in FIGS. 16 and 17, as well as that shown in FIG. 15, are provided by respective cross-sections of the sintered bodies.

As understood from FIG. 15, the sintered body of Embodiment 12 according to the present invention has a relatively large amount of oxygen atoms existing in the grains of the ceramic body. In contrast, as understood by FIG. 16 depicting the sintered body of Comparative Example 3 in which 5 weight % of yttria is added, an oxygen concentration becomes relatively low. Moreover, as understood by a comparison between FIGS. 16 and 17, the concentration of oxygen atoms is substantially equal to the concentration of yttria.

What is claimed is:

1. A metal including member comprising a construction such that a metal member is embedded in a substrate member made of an aluminum nitride sintered body, said metal member and said substrate member are integrally sintered, and a part of said substrate member is made of an aluminum sintered body having an amount of total metal elements other than aluminum smaller than 100 ppm, a room temperature volume resistivity greater than $1.0 \times 10^9$ Ωcm and smaller than $1.0 \times 10^{13}$ Ωcm, and a relative density of greater than 99.5%.

2. The metal including member according to claim 1, wherein a first portion of said substrate member which exists at one side of said metal member is formed by said aluminum nitride sintered body.

3. The metal including member according to claim 2, wherein an aluminum nitride sintered body having a relative density of greater than 97.5% and smaller than 99.5% exists in a second portion of said substrate member which exists at the other side of said metal member.

4. An electrostatic chuck comprising the metal including member set forth in claim 1 wherein a portion of said substrate member which exists at a dielectric layer side thereof is made of said aluminum nitride sintered body said metal member is an electrode, and a work is chucked on said electrode through said dielectric layer.

5. A method of producing an aluminum nitride sintered body comprising the steps of, preparing an aluminum nitride raw material having an amount of total metal elements other than aluminum of smaller than 100 ppm, sintering the thus prepared aluminum nitride raw material under a temperature of 1700° C.–2000° C. and a pressure greater than 100 kg/cm$^2$ to obtain an aluminum nitride sintered body, and subjecting the thus obtained aluminum nitride sintered body to a heat treatment under a temperature of greater than 1850° C.

6. A method of producing an aluminum nitride sintered body having an amount of total metal elements other than aluminum smaller than 100 ppm, a room temperature volume resistivity greater than $1.0 \times 10^9$ Ωcm and smaller than $1.0 \times 10^{13}$ Ωcm, and a relative density of greater than 99.5% comprising the steps of, preparing an aluminum nitride raw material having an amount of total metal elements other than aluminum of smaller than 100 ppm, forming the thus prepared aluminum nitride raw material to obtain a formed body, embedding a metal member in the thus obtained formed body to obtain a metal including formed body, sintering the thus obtained metal including formed body under a temperature of 1850° C.–2200° C. and a pressure of 50 kg/cm$^2$ to obtain a metal including member, in which said metal member is embedded in a substrate member made of said aluminum nitride sintered body, said substrate member is substantially divided into a first portion and a second portion by said metal member, and said first portion has a thickness of smaller than 10 mm, thereby obtaining said aluminum nitride sintered body as first portion of said substrate member.

7. A method of producing a metal including member in which a metal member is embedded in a substrate member made of aluminum nitride having an amount of total metal elements other than aluminum smaller than 100 ppm, a room temperature volume resistivity greater than $10 \times 10^9$ Ωcm and smaller than $10 \times 10^{13}$, Ωcm, and a relative density of greater than 99.5%, said substrate member is substantially divided into a first portion and a second portion by said metal member, and a ratio of thickness between said first portion and a second portion is 1:2 or more, comprising the steps of preparing an aluminum nitride raw material having an amount of total metal elements other than aluminum of smaller than 100 ppm, forming the thus prepared aluminum nitride raw material to obtain a formed body, embedding a metal member in the thus obtained formed body to obtain a metal including formed body, sintering the thus obtained metal including formed body under a temperature of 1850° C.–2200° C. and a pressure of 50 kg/cm$^2$.

8. The metal including member according to claim 1, wherein said aluminum nitride sintered body has a g-value of unpaired electrons in a spectrum of an electron spin resonance of smaller than 2,000.

9. The metal including member according to claim 1, wherein said aluminum nitride sintered body has a spin amount of aluminum per unit mg in a spectrum of an electron spin resonance of greater than $5 \times 10^{12}$ spin.

10. The metal including member according to claim 1, wherein said aluminum nitride sintered body has a main peak in a wavelength region from 350 mm to 370 mm measured by cathode luminescence.

* * * * *